(12) United States Patent
Kikuchi et al.

(10) Patent No.: US 6,732,775 B1
(45) Date of Patent: May 11, 2004

(54) ELASTIC WHEEL

(75) Inventors: Hirohumi Kikuchi, Kawasaki (JP);
Katsumi Tashiro, Fuchu (JP);
Masanori Murase, Hidaka (JP);
Keiichiro Mizuno, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/048,648

(22) PCT Filed: Aug. 1, 2000

(86) PCT No.: PCT/JP00/05078

§ 371 (c)(1),
(2), (4) Date: Feb. 4, 2002

(87) PCT Pub. No.: WO01/08903

PCT Pub. Date: Feb. 8, 2001

(30) Foreign Application Priority Data

| Aug. 2, 1999 | (JP) | .......................... 11/219167 |
| Aug. 27, 1999 | (JP) | .......................... 11/240913 |
| Sep. 13, 1999 | (JP) | .......................... 11/259101 |
| Oct. 25, 1999 | (JP) | .......................... 11/302805 |
| Dec. 27, 1999 | (JP) | .......................... 11/370009 |
| Mar. 21, 2000 | (JP) | .......................... 2000/79065 |

(51) Int. Cl.$^7$ ............................ B60B 9/10; B60B 17/00
(52) U.S. Cl. ............................ 152/47; 152/48; 152/50; 295/11; 295/12
(58) Field of Search ............................ 152/40, 42, 47, 152/48, 50, 246, 323; 295/7, 11, 12

(56) References Cited

U.S. PATENT DOCUMENTS

| 1,427,995 A | * | 9/1922 | Allen | ............................ 152/47 |
| 1,447,365 A | * | 3/1923 | Walther | ............................ 152/47 |
| 1,519,971 A | * | 12/1924 | Hale | ............................ 152/47 |
| 1,555,479 A | * | 9/1925 | Morand | ............................ 152/47 |
| 1,630,225 A | * | 5/1927 | Swain | ............................ 152/47 |
| 1,974,009 A | * | 9/1934 | Bourdon | ............................ 152/47 |
| 2,609,856 A | | 9/1952 | Paton | |
| 2,659,622 A | * | 11/1953 | Watter | ............................ 295/11 |
| 2,891,593 A | | 6/1959 | Deuring et al. | |
| 2,912,034 A | | 11/1959 | Mattern | |
| 2,919,737 A | * | 1/1960 | Everitt | ............................ 152/47 |
| 3,771,833 A | * | 11/1973 | Smith | ............................ 301/11.1 |
| 4,546,807 A | | 10/1985 | Cummins et al. | |
| 4,765,382 A | * | 8/1988 | Sahagian | ............................ 152/48 |

FOREIGN PATENT DOCUMENTS

| DE | 3 734 890 A1 | 4/1989 |
| JP | 27-1805 B1 | 5/1952 |
| JP | 57-073203 A | 5/1982 |
| JP | 59-188701 A | 12/1984 |
| JP | 5-338401 A | 12/1993 |
| JP | 10-237221 A | 9/1998 |
| WO | 98/33666 A1 | 8/1998 |

OTHER PUBLICATIONS

Microfilm of the specification and drawings annexed to the request of Japanese Utility Model Application No. 83881/1983 (Laid–Open No. 188701/1984), Fig. 3, Toyota Motor Corp., Dec. 14, 1984.

* cited by examiner

*Primary Examiner*—Stephen Avila
*Assistant Examiner*—Jason R. Bellinger
(74) *Attorney, Agent, or Firm*—Sughrue Mion, PLLC

(57) ABSTRACT

An elastic wheel having a disk 1 equipped with a base rim 2 and a rim 3 for supporting a tire includes a pair of guides 4 fixed annularly on the inner peripheral surface of the rim 3 and a pair of wall portions 5 fixed annularly on the both side areas in the axial direction of the wheel on the outer peripheral surface of the base rim 2, where rubber elastic bodies 6 are fitted annularly between the side surfaces of the guides 4 and the side surfaces of the wall portions, respectively. The elastic bodies 6 being installed are able to absorb vibrations by their shearing deformations, so that especially the riding comfortableness performance, the vibrationproof performance, and the soundproof performance can be improved against the small input load. Regarding the soundproof performance, furthermore, it is extremely effective on a high frequency area of 100 Hz or higher.

2 Claims, 13 Drawing Sheets

(a) (b)

ELASTIC WHEEL

This is a National Stage entry under 35 U.S.C. §371 of International Application No. PCT/JP00/05078 filed Aug. 1, 2000, the entire disclosure of which is incorporated herein by reference.

TECHNICAL FIELD

The present invention relates to elastic wheels to be used as wheels of vehicles, and more particularly to elastic wheels with excellent riding comfortableness performance, vibrationproof performance, and soundproof performance.

BACKGROUND ART

An elastic wheel typically comprises a disk to be fixed on an axle hub and a rim for supporting a tire, where an vibrationproof body is provided between the disk and the rim. Various proposals have been put forth to provide the elastic wheel with improved vibrationproof performance and riding comfortableness performance. As one of these proposals, a tire wheel is disclosed in Japanese Utility Model Laid-Open Publication No. Sho. 59-188701, in which a spring is used as a vibrationproof body to improve the riding comfort.

Alternatively, an elastic wheel with a vibrationproof body made of rubber and arranged between a rim and a disk has been also proposed. For example, in Japanese Utility Model Laid-Open Publication No. Sho. 57-73203, there is proposed an elastic wheel in which a rim is connected to a disk via a rubber-like elastic body. Furthermore, Japanese Patent Laid-Open Publication No. Hei. 5-338401 discloses an elastic wheel where a clearance is created between a rim and an elastic wheel and a vibrationproof rubber is fitted into the clearance. In WO 9833666 official gazette, there is disclosed a wheel barrier assembly in which an annular rubber strip is arranged between a rim and an inner rim having the same profile as that of the rim.

However, in the conventional elastic wheels where rubbers are used as their vibrationproof bodies and are uniformly arranged between their rims and disks respectively, each of the rubber elastic body, which is cemented to the inner peripheral surface of the rim and the outer peripheral surface of the disk by means of vulcanization adhesion, is provided. Therefore, the rubber elastic body appropriately prevents each of vibrations transmitted from the rim to the disk in the axial direction, the radial direction, and the rotational direction, but there is a problem that it cannot prevent a displacement of the rubber elastic body under a heavy load. In other words, the cross sectional profile of the rubber is consistent, so that it is difficult to obtain appropriate vibrationproof characteristics with respect to each of cases from the small input load to the large input load. In this respect, there is the same problem when the spring is used as the vibrationproof body.

Furthermore, it has not been make clear the relationship between the rubber arranged between the rim and the disk and the soundproof performance, so that it is susceptible of improvement in terms of soundproof.

Accordingly, an object of the present invention is to provide an elastic wheel with improvements in riding comfortableness performance, vibrationproof performance, and soundproof performance without impairment of the durability and the safety at any time of small input load to large input load.

DISCLOSURE OF THE INVENTION

The present inventors have devoted their efforts to solve the above problems while making full use of the characteristics of a rubber elastic body as a vibrationproof body. As a result, the present invention has completed because of their finding that the following configuration will attain the object of the present invention.

In other words, the present invention is an elastic wheel having a disk equipped with a base rim and a rim for supporting a tire, comprising a pair of guides fixed annularly on the inner peripheral surface of the rim and a pair of wall portions fixed annularly on the both side areas in the axial direction of the wheel on the outer peripheral surface of the base rim, in which rubber elastic bodies are interposed annularly between the side surfaces of the guides and the side surfaces of the wall portions, respectively.

Consequently, the rubber elastic bodies being installed are able to absorb vibrations by their shearing deformations, so that especially the riding comfortableness performance, vibrationproof performance, and the soundproof performance can be improved against the small input load. Regarding the soundproof performance, furthermore, it is extremely effective on a high frequency area of 100 Hz or higher.

Here, in the elastic wheel, it is preferable that the width of the pair of guides in the axial direction of the wheel may be smaller than the width of the pair of wall portions in the axial direction of the wheel, the inner ends of the pair of the guides in the radial direction of the wheel are connected to each other to form a generally U-shape in cross section in the axial direction of the wheel, and a rubber elastic body is fitted annularly between the inner peripheral surface of the guide in a generally U-shape and the outer peripheral surface of the base rim with a space provided between one of the surfaces and the elastic body. Alternatively, the width of the pair of guides in the axial direction of the wheel may be greater than the width of the pair of wall portions in the axial direction of the wheel, the outer ends of the pair of guides in the radial direction of the wheel are connected to each other to form a generally inverted U-shape in cross section in the axial direction of the wheel, and a rubber elastic body is fitted annularly between the outer peripheral surface of the wall portions in a generally inverted U-shape and the inner peripheral surface of the rim with a space provided between one of the surfaces and the elastic body. Consequently, in addition to surely obtain the effects described above, the compression action of the rubber elastic body provided on the outer peripheral surface of the base rim or the inner peripheral surface of the rim or the like is able to prevent the large deformation against the large input load.

Also, the present invention is an elastic wheel having a disk equipped with a base rim and a rim for supporting a tire, inserting an elasticity-providing device, between an outer peripheral surface of said base rim and an inner peripheral surface of said rim, the elasticity-providing device comprising; a pair of guides fixed annularly around an internal peripheral surface of an external annular ring body of two annular ring bodies having different radiuses and concentrically arranged together; and a pair of wall portions fixed annularly on both side areas in the axial direction of the wheel on an outer peripheral surface of an internal annular ring body, wherein rubber elastic bodies are fitted annularly between the side surfaces of the guides and the side surfaces of the wall portions, respectively.

In this case, also, the vibrations can be absorbed by the shearing deformation of the rubber elastic body being positioned, so that especially the riding comfortableness performance, the vibrationproof performance, and the soundproof performance can be improved. Regarding the soundproof performance, furthermore, it is extremely effective on a high frequency area of 100 Hz or higher. Furthermore, the manufacture can be easily performed because the afore-mentioned elasticity-providing device is provided.

Here, also in the elastic wheel, preferably, the elasticity-providing device may be constructed in such a manner that a width of the pair of guides in the axial direction of the wheel is smaller than a width of the pair of wall portions in the axial direction of the wheel, inner ends of the pair of guides in the radial direction of the wheel are connected to each other to form a generally U-shape in cross section in the axial direction of the wheel, and rubber elastic bodies are fitted annularly between the inner peripheral surfaces of the guides and the outer peripheral surface of the internal annular ring body, respectively, with a space provided between one of the surfaces and the elastic body. Alternatively, preferably, the elasticity-providing device may be constructed in such a manner that a width of the pair of guides in the axial direction of the wheel is greater than the width of the pair of wall portions in the axial direction of the wheel, outer ends of the pair of the wall portions in the radial direction of the wheel are connected to each other to form a generally inverted U-shape in cross section in the axial direction of the wheel, and rubber elastic bodies are fitted annularly between outer peripheral surfaces of the wall portions having the inverted U-shape and an inner peripheral surface of the external annular ring body, respectively, with a space provided between one of the surfaces and the elastic body. Consequently, the compression action of the rubber elastic body provided on the outer peripheral surface of the internal annular ring body or the inner peripheral surface of the external annular ring body is able to prevent the large deformation against the large input load as well as obtaining the above effects surely.

Also, in the elastic wheel of the present invention, the rubber elastic bodies may be fitted annularly between stoppers extending from the pair of guides in almost the axial direction, respectively, and stoppers extending from the pair of wall portions in almost the axial direction, respectively. Thereby, the rubber elastic body vertically touches the stopper as the input load becomes large, so that the large deformation can be prevented.

Also, the present invention is an elastic wheel having a disk equipped with a base rim and a rim for supporting a tire, wherein wall portions are fixed annularly on both edges of the outer peripheral surface of the base rim, and rubber elastic bodies are fitted annularly between both side surfaces of the rim and both internal surfaces of the wall portions, respectively, wherein both edges of the rim extend over the wall portions.

Thereby, the vibrations can be absorbed by the shearing deformation of the rubber elastic body, so that especially the riding comfortableness performance, vibrationproof performance, and the soundproof performance can be improved at the time of the small input load. At the time of the large input load, the large deformation can be prevented by touching the rim extending over the wall portion on the upper end of the wall portion.

Also, the present invention is an elastic wheel having a disk and a rim for supporting a tire, wherein a rubber elastic body is fitted annularly between an inner side surface of a guide fixed annularly on an inner peripheral surface of the rim and an external side surface of the disk, and a rubber elastic body is fitted annularly between the inner peripheral surface of the rim and the outer peripheral surface of the disk with a space provided between one of the surfaces and the elastic body.

Thereby, the vibrations can be absorbed by the shearing deformation at the time of the small input load, so that especially the riding comfortableness performance, the vibrationproof performance, and the soundproof performance can be improved. At the time of the large input load, the large deformation can be prevented by the compression action of the rubber elastic body provided on the outer peripheral surface of the disk.

Also, the present invention is an elastic wheel having a disk equipped with a base rim and a rim for supporting a tire, and also having a pair of guides fixed annularly on an inner peripheral surface of the rim and a pair of wall portions fixed annularly on both side areas in the axial direction of the wheel on an outer peripheral surface of the base rim, where rubber elastic bodies are fitted annularly between side surfaces of the guides and side surfaces of the wall portions, respectively, comprising: an engagement mechanism that interconnects to the outer peripheral surface of the base rim and the inner peripheral surface of the rim between both rubber elastic bodies.

Thereby, the large displacement of the rubber elastic body at the time of the large load can be prevented in addition to absorb the vibrations by the shearing deformation of the rubber elastic body, so that the brake and the traction can be transmitted from the disk to the rim even when the rubber elastic body has broken. In addition, regarding the soundproof performance, it is extremely effective on a high frequency area of 100 Hz or higher.

Here, in the above elastic wheel, it is preferable that the engagement mechanism is an engagement mechanism of dent lines which are provided as protrusions on the outer peripheral surface of the base rim and the inner peripheral surface of the rim, respectively. Alternatively, it is preferable that the engagement mechanism is an engagement mechanism comprised of a dent line provided as protrusions on the inner peripheral surface of the rim and an opening line provided as pores on the base rim. Thereby, the rim and the disk are appropriately engaged with each other, so that the brake and traction can be surely transmitted from the disk to the rim.

Alternatively, furthermore, in an elastic wheel having a disk equipped with a base rim and a rim for supporting a tire, and also having a pair of guides fixed annularly on an inner peripheral surface of the rim and a pair of wall portions fixed annularly on both side areas in the axial direction of the wheel on an outer peripheral surface of the base rim, where rubber elastic bodies are fitted between side surfaces of the guides and side surfaces of the wall portions, respectively, an engagement mechanism that interconnects to the side surface of the guide and the side surface of the wall portion may be provided. In this case, the shearing deformation of the rubber elastic body is able to absorb the vibrations, so that the brake and the traction can be transmitted from the disk to the rim even when the rubber elastic body has broken.

Also, the present invention is an elastic wheel having a disk equipped with a base rim and a rim for supporting a tire, and also having a pair of guides fixed annularly on an inner peripheral surface of the rim and a pair of wall portions fixed annularly on both side areas in the axial direction of the wheel on an outer peripheral surface of the base rim, where rubber elastic bodies are fitted annularly between side surfaces of the guides and side surfaces of the wall portions, respectively, comprising: two or more bolts that penetrate through the rubber elastic bodies in the axial direction of the wheel and loosely pass through the guides and the wall portions, respectively, where the bolts are axial symmetric with respect to the axis of the tire and tips of the bolts are screwed in respective nuts.

Thereby, the vibrations can be absorbed by the shearing deformation of the elastic body, so that especially the riding comfortableness performance, the vibrationproof performance, and the soundproof performance can be improved. In addition, the falling out of the rim can be prevented even when the rubber elastic body has broken. In addition, regarding the soundproof performance, it is extremely effective on a high frequency area of 100 Hz or higher.

Here, in the above elastic wheel, it is preferable that washers lie between a head of the bolt and the guide or the wall portion and between the nut and the wall portion or the guide. Thereby, the washer distributes the pressure uniformly, allowing the increase of the function of absorbing the vibration.

Also, the present invention is an elastic wheel having a disk equipped with a base rim and a rim for supporting a tire, and also having a pair of guides fixed annularly on an inner peripheral surface of the rim and a pair of wall portions fixed annularly on both side areas in the axial direction of the wheel on an outer peripheral surface of the base rim, where rubber elastic bodies are fitted annularly between side surfaces of the guides and side surfaces of the wall portions, respectively, comprising two or more protrusions that penetrate through the rubber elastic bodies from respective side surfaces of the guides in the axial direction of the wheel and loosely pass through the respective wall portions to extend therefrom, where the protrusions are axial symmetric with respect to the axis of the tire and tips of the protrusions are screwed in respective nuts.

In this case, also, the vibrations can be absorbed by the shearing deformation of the elastic body, so that especially the riding comfortableness performance, the vibrationproof performance, and the soundproof performance can be improved. Even when the rubber elastic body has broken, the falling out of the rim can be prevented.

Here, in the above elastic wheel, preferably, a washer may lie between the wall portion and the nut. Thereby, the pressure can be distributed uniformly by the washer to enhance the function of the vibration absorption.

Also, the present invention is an elastic wheel having a disk equipped with a base rim and a rim for supporting a tire, and also having a pair of guides fixed annularly on an inner peripheral surface of the rim and a pair of wall portions fixed annularly on both side areas in the axial direction of the wheel on an outer peripheral surface of the base rim, where rubber elastic bodies are fitted annularly between side surfaces of the guides and side surfaces of the wall portions, respectively, comprising two or more protrusions that penetrate through the rubber elastic bodies from respective side surfaces of the wall portions in the axial direction of the wheel and loosely pass through the respective guides to extend therefrom, where the protrusions are axial symmetric with respect to the axis of the tire and tips of the protrusions are screwed in respective nuts. In this case, the same effects as described above can be also obtained. Here, also it is preferable that a washer lies between the guide and the nut. Thereby, the pressure can be distributed uniformly by the washer, so that the function of absorbing the vibration can be enhanced.

Also, the present invention is an elastic wheel having a disk fixed on an axle hub and a rim for supporting a tire, comprising a plurality of guides fixed annularly on an inner peripheral surface of the rim, and a plurality of spacers fixed on an outer peripheral surface of the disk so that the spacers and the guides are arranged alternately in the axial direction of the wheel, wherein a rubber elastic body is fitted annularly between the guides and the spacers so as to cover at least a part of the tips of them.

Thereby, the vibrations can be absorbed by the shearing deformation of the rubber elastic body being placed, so that especially the riding comfortableness performance, the vibrationproof performance, and the soundproof performance can be improved against the small input load. In addition, the rigidity in the axial direction of the wheel becomes increase, so that it is effective to prevent the vibration in that direction. Furthermore, regarding the soundproof performance, it is extremely effective on a high frequency area of 100 Hz or higher. Still furthermore, the compression force is applied on the tip portions as at least part of the tip portions of guides and spacers is covered with the rubber elastic body. As a result, the large deformation can be prevented.

Also, the present invention is an elastic wheel having a disk to be fixed on an axle hub and a rim for supporting a tire, inserting an elasticity-providing device, between an outer peripheral surface of the disk and an inner peripheral surface of the rim, said elasticity-providing device comprising a plurality of guides fixed annularly on an internal peripheral surface of an external annular ring body of two distinct annular ring bodies having different radiuses and concentrically arranged together a plurality of spacers fixed annularly on an outer peripheral surface of an internal annular ring body, where the guides and the spacers are alternately arranged in the axial direction of the wheel, and rubber elastic bodies fitted annularly between the guides and the spacers so as to cover at least a part of tips of them.

Thereby, the manufacture can be easily performed in addition to provision of the above effects as the above elasticity-providing device is provided.

Here, in the above elastic wheel, it is preferable that there are two guides and two spacers, or there are two guides and three spacers, or three guides and two spacers, or there are one guide and two spacers, while a cross sectional profile of the guide in the axial direction of the wheel is preferably a general trapezoid.

In addition, the present invention is an elastic wheel having a disk equipped with a base rim and a rim for supporting a tire, characterized by comprising at least one guide fixed annularly on an inner peripheral surface of the rim in the radial direction of the wheel, and at least one wall portion fixed annularly on an outer peripheral surface of the base rim in the radial direction of the wheel, wherein a rubber-stacked body comprised of rubber and steel plates being stacked in alternate order in the axial direction of the wheel is installed annularly between side surfaces of the guide and the wall portion in a bridging manner.

Thereby, the vibration can be absorbed by the shearing deformation in the vertical direction of the placed rubber staked body, so that especially the riding comfortableness performance, the vibrationproof performance, and the soundproof performance can be improved against the small input load. In addition, regarding the soundproof performance, it is extremely effective on a high frequency area of 100 Hz or higher. Furthermore, the rigidity of the rubber-stacked body in the axial direction of the wheel is greater than the rigidity thereof in the radial direction of the wheel, so that the rigidity in the lateral direction of the tire can be kept to prevent the decrease in the handling stability.

Also, the present invention is an elastic wheel having a disk equipped with a base rim and a rim for supporting a tire, inserting an elastic-providing device between an outer peripheral surface of the base rim and an inner peripheral surface of the rim, the device comprising at least one guide fixed annularly on an internal surface of an external annular ring body of two distinct annular ring bodies having different radiuses and concentrically arranged together, in the radial direction of the wheel, at least one wall portion fixed annularly on an outer peripheral portion of an internal annular ring body, in the radial direction of the wheel, and a rubber-stacked body comprised of rubber and steel plates being stacked in alternate order in the axial direction of the wheel so as to be installed annularly between the guide and the wall portion in a bridging manner.

Thereby, the manufacture can be easily performed in addition to provision of the above effects as the above elasticity-providing device is provided.

Here, in the above elastic wheel, it is preferable that a rubber elastic body as a stopper is placed on a surface facing to an end of the guide or the wall portion in the radial direction of the wheel. Thereby, the large deformation can be prevented by the compression action of the rubber elastic body as a stopper being annularly arranged against the large input load. In addition, it is preferable that the guide may be positioned almost at the middle of the rim in the axial direction of the wheel, a pair of the wall portions may be positioned at both side areas in the axial direction of the wheel, and the rubber-stacked body may be installed annularly between both side surfaces of the guide and both internal side surfaces of the pair of wall portions, respectively, in a bridging manner. Alternatively, a pair of the guides may be positioned at both side areas in the axial direction of the wheel, the wall portion may be positioned almost at the middle of the rim in the axial direction of the wheel, and the rubber-stacked body may be installed annularly between both side surfaces of the wall portion and both internal side surfaces of the pair of guides, respectively, in a bridging manner. Furthermore, a pair of the guides may be arranged in parallel to each other, a pair of the wall portions may be arranged in parallel to each other so as to have a width greater than that of the pair of guides in the axial direction of the wheel, and the rubber-stacked body may be installed annularly between both external side surfaces of the pair of guides and both internal side surfaces of the pair of wall portions, respectively, in a bridging manner. Alternatively a pair of the guides may be arranged in parallel to each other, a pair of the wall portions may be arranged in parallel to each other so as to have a width smaller than that of the pair of guides in the axial direction of the wheel, and the rubber-stacked body may be installed annularly between both internal side surfaces of the pair of guides and both external side surfaces of the pair of wall portions, respectively, in a bridging manner.

BEST MODES FOR CARRYING OUT THE INVENTION

Figure 1:
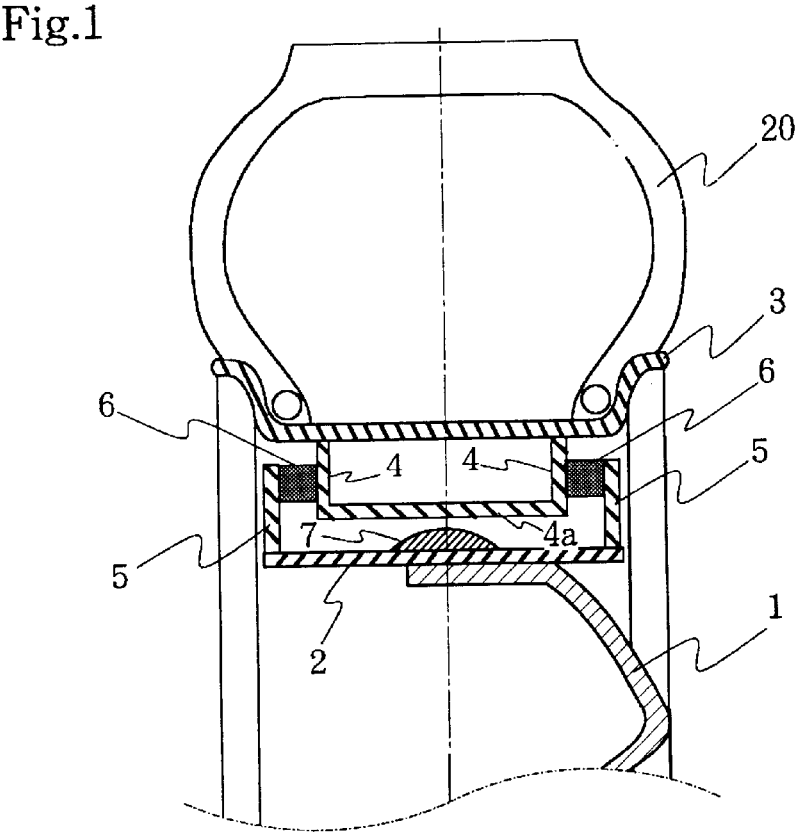
FIG. 1 is a cross sectional view of an enlarged portion of an elastic wheel according to one embodiment of the present invention.

An elastic wheel according to one of embodiments of the present invention shown in FIG. 1 comprises a disk 1 to be fixed on an axle hub (not shown) and a base rim 2. The disk 1 and the base rim 2 are integrally molded as a single piece, or alternatively may be a spoke or mesh wheel or the like combined with a spoke or mesh supporting body or the like. The material of the disk 1 may be any material such as steel, aluminum, magnesium, synthetic resin, or the like. When it is intended to reduce its weight, an aluminum or synthetic resin material may be preferable. Such a fact will be commonly adapted to all of the elastic wheels related to the following embodiments. Furthermore, a pair of guides 4 is fixed annularly on the inner peripheral surface of the rim 3 that supports the tire 20. Both ends of the pair of guides 4 in the radial direction of the wheel are connected to each other to form a general U-shape of the cross sectional profile in the axial direction of the wheel as a whole. The guides 4, by making the cross section in the axial direction of the wheel the general U shape, acts as a function of a stopper against large input load by an inner peripheral surface 4a thereof and a rubber elastic body 7, described below, cooperating with each other. The shape of the rim 3 is not limited to a particular one. In addition to the standard products it may be of any shape according to application as required. For example, the rim may be one having different diameters at its opposite ends. Alternatively, a pair of guides 4 may be formed by shaping a cross sectional profile of the rim 3 in the axial direction of the wheel into a depression.

A pair of wall portions 5 is formed annularly on axial opposite ends of the outer peripheral surface of the base rim 2 under the condition of being wider than the width between the guides 4 in the axial direction of the wheel. Rubber elastic bodies 6 are interposed and cemented annularly between the outer surfaces of the guides 4 and the inner surfaces of the wall portions 5, respectively, using adhesive means such as a vulcanizing adhesion. Furthermore, a rubber elastic body 7 is interposed annularly between the inner peripheral surface 4a of the guide 4 and the outer peripheral surface of the base rim 2. The rubber elastic body 7 is cemented on the outer peripheral surface of the base rim 2 using adhesive means such as a vulcanizing adhesion, while creating clearance between the rubber elastic body 7 and the inner peripheral surface 4a of the guide 4. Alternatively, the rubber elastic body 7 may be cemented on the inner peripheral surface 4a of the guide 4, while creating clearance between the rubber elastic body 7 and the outer peripheral surface of the rim 2. Furthermore, it is preferable to shape the rubber elastic body 7 like a half-moon in axial cross section, because the input load may be gradually shifted from the shear force to the compress force.

Figure 2:
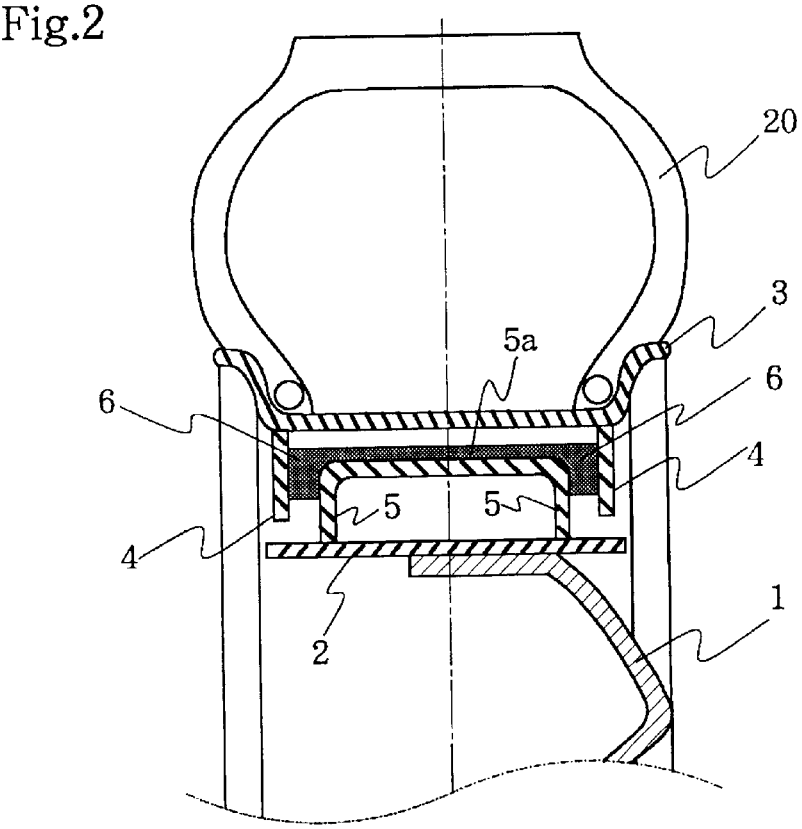
FIG. 2 is a cross sectional view of an enlarged portion of an elastic wheel according to another embodiment of the present invention.

An elastic wheel in accordance with another embodiment of the present invention, as shown in FIG. 2, is that the width between the pair of wall portions 5 is smaller than that of the pair of guides 4 where the pair of wall portions 5 is fixed on both side areas of the outer peripheral surface of the base rim 2 in the direction of the axial direction of the wheel. In this case, rubber elastic bodies 6 are fitted annularly between both inner surfaces of the guides 4 and both outer surfaces of the wall portions 5, respectively. In addition, the external ends of the pair of wall portions 5 extending in the radial direction of the wheel are integrally connected to each other to make the pair of wall portions 5 a general inverted U shape in cross section in the axial direction of the wheel. A rubber elastic body is provided as a stopper fitted annularly between the outer peripheral portion 5a and the inner peripheral surface of the rim 3. The way of fitting is, for example, by bonding the rubber elastic body with the inner peripheral surface of the rim 3 while creating a clearance between the rubber elastic body and the outer peripheral surface 5a of the wall portions 5, or alternatively by bonding the rubber elastic body with the outer peripheral portion 5a while creating a clearance between the rubber elastic body and the inner peripheral surface of the rim 3, or the like. In addition, as shown in FIG. 2, a pair of rubber elastic bodies 6 may extend over the outer peripheral surface 5a so as to connect them together as an integral part additionally having a stopper function. Accordingly, the same effect can be obtained just as the elastic wheel of the preferred embodiment of the present invention shown in FIG. 1. That is, if the input load is not so large, then the improvements of the riding comfortableness performance, the vibrationproof performance, and the soundproof performance can be sufficiently attained by the action of the rubber elastic body 6. If the input load becomes large, the compressing action of the rubber elastic body 6 prevents itself from a large deformation thereof.

By the way, any known rubber as a vibrationproof rubber may be used as the rubber elastic body to be used in the present invention, and it can be prepared by appropriately compounding a natural or synthetic rubber, for example, a diene-type rubber such as a butadiene rubber, a styrene/butadiene copolymer rubber, and a butyl rubber with a compounding agent such as sulfur, a vulcanization accelerator, an anti-oxidant, and carbon black. The JIS-A hardness (Hd) of the rubber elastic body may be preferably in the range of 30 to 80° from the viewpoint of vibration absorbing property and durability. In addition, the elastic modulus may be preferably in the range of $1 \times 10^3$ to $1 \times 10^5$ $N/cm^2$.

Figure 7:
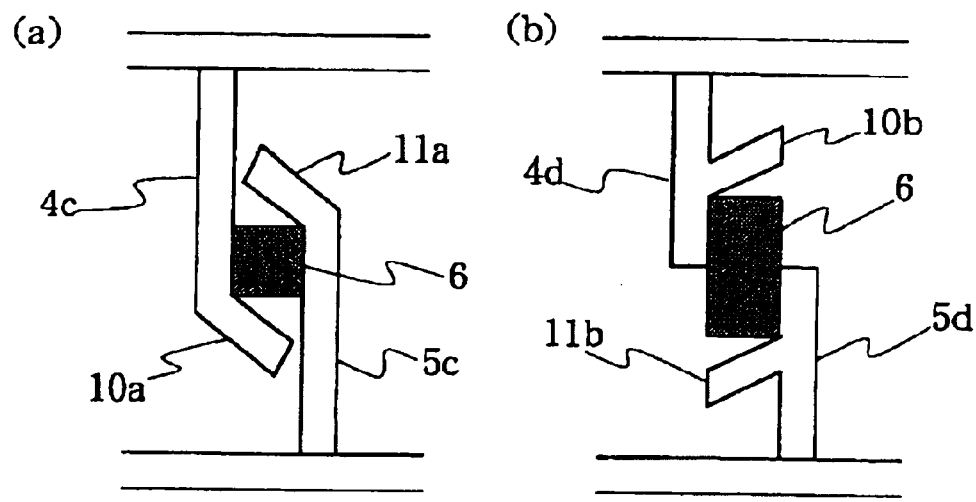
FIG. 7 is a partial cross sectional view illustrating a stopper.

As in the preferred embodiment of the present invention shown in FIG. 1 or FIG. 2, a stopper shown in FIG. 7 may be provided instead of the structure in which the ends of the guides 4 or the ends of the wall portions 5 are integrally connected with each other to make it to have a general U shape or a general inverted U shape of a cross sectional profile in the axial direction of the wheel to provide a stopper function against the large input load by the combination of such a portion with the rubber elastic body 7. In FIG. 7(a), the rubber elastic body 6 is sandwiched between a stopper 10a that extends outwardly from the guide 4c in the axial direction of the wheel and a stopper 11a that extends inwardly from the wall portion 5c in the axial direction of the wheel in the vertical direction. Also, in FIG. 7(b), the rubber elastic body 6 is sandwiched between a stopper lob that extends outwardly from the guide portion 4d in the axial direction and a stopper 11b that extends inwardly from the wall portion 5d in the axial direction in the vertical direction. Thereby, the upper or lower end of the rubber elastic body 6 can be touched with the stopper when the input load becomes large even though the above rubber elastic body 7 is not present, so that the large deformation can be prevented.

Figure 3:
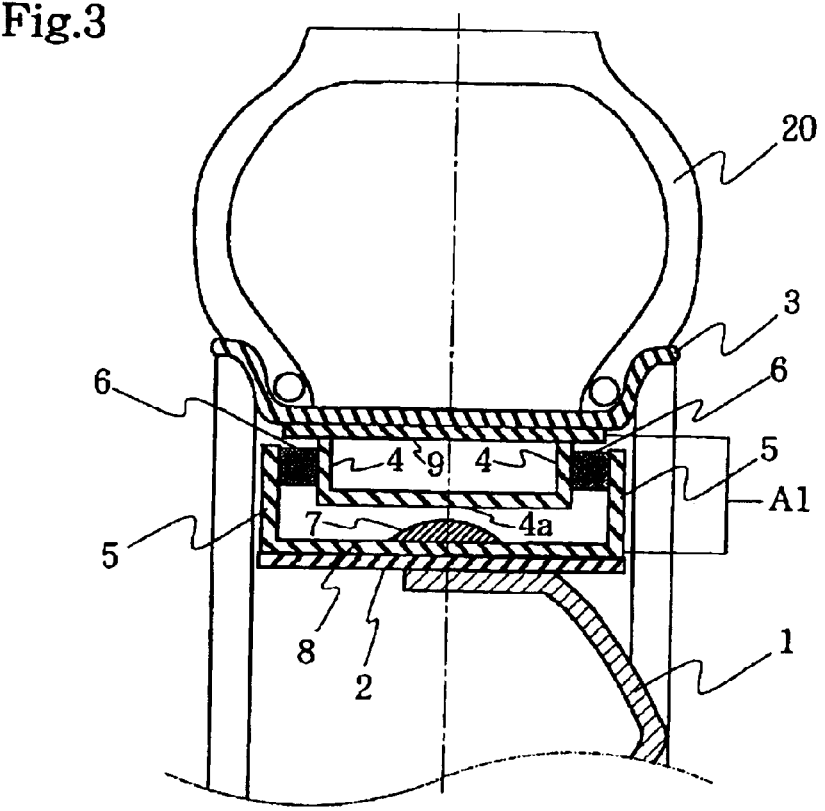
FIG. 3 is a cross sectional view of an enlarged portion of an elastic wheel according to still another embodiment of the present invention.

FIG. 3 shows an elastic wheel as another embodiment of the present invention. In this preferred embodiment, between the outer peripheral surface of the base rim 2 and the inner peripheral surface of the rim 3, an elasticity-providing device A1 having the same functions as those of the preferred embodiment shown in FIG. 1 and FIG. 2 is inserted, and it may be strongly fixed in a predetermined position by means of welding or the like. The elasticity-providing device A1 includes: a pair of guides 4 fixed annularly on the internal surface of an external annular ring body 9 of two annular ring bodies having different radiuses and concentrically arranged together; and a pair of wall portions 5 fixed annularly on the both side areas in the axial direction of the wheel on the outer peripheral surface of an internal annular ring body 8, where rubber elastic bodies 6 are fitted annularly between the side surfaces of the guides 4 and the side surfaces of the wall portions 5, respectively. The elasticity-providing device A1 provides a structure, which is substantially the same as one provided between the outer peripheral surface of the base rim 2 and the inner peripheral surface of the rim 3 shown in FIG. 1 or FIG. 2, is arranged between the inner peripheral surface of the external annular ring body 9 and the external peripheral surface of the internal annular ring body 8.

Namely, in the elasticity-providing device A1 of the preferred embodiment shown in FIG. 3, the width between the pair of guides 4 in the axial direction of the wheel is smaller than the width between the pair of wall portions 5 in the axial direction of the wheel. In addition, the inner ends of the pair of guides 4 in the radial direction of the wheel is integrally connected together to make a general U shape in cross section in the axial direction of the wheel. The rubber elastic body 7 is fitted annularly between the inner peripheral surface 4a of the generally U-shaped portion by the guides 4 and the outer peripheral surface of the internal annular ring body 8. In FIG. 3, the rubber elastic body 7 is cemented on the outer peripheral surface of the internal annular ring body 8, while creating a clearance between the rubber elastic body 7 and the internal peripheral surface 4a. The rubber elastic body 7 may be cemented on the internal peripheral surface 4a, while creating a clearance between the rubber elastic body 7 and the outer peripheral surface of the internal annular ring body 8. Installing the elasticity-providing device A1 in place allows the facilitated fabrication procedure of the wheel.

Figure 4:
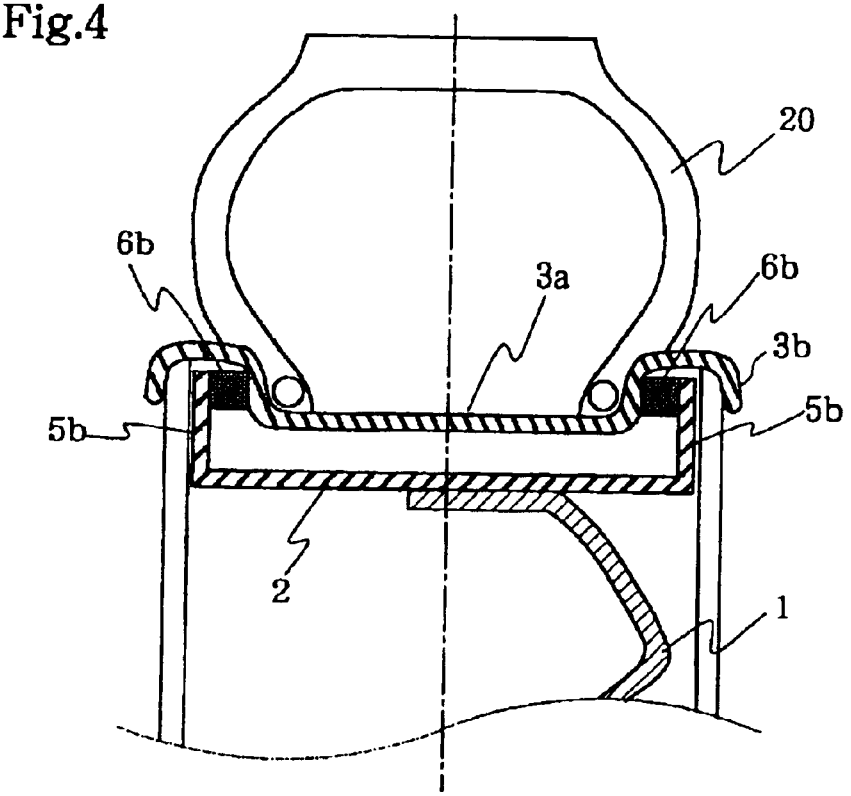
FIG. 4 is a cross sectional view of an enlarged portion of an elastic wheel according to still another embodiment of the present invention.

FIG. 4 shows an elastic wheel of the still another embodiment of the present invention. In the preferred embodiment shown in FIG. 4, the wall portions 5b are fixed annularly on the both edges of the outer peripheral surface of the base rim 2. In addition, rubber elastic bodies 6b are fitted annularly between both side surfaces of the rims 3a and both internal surfaces of the wall portions 5b, respectively, and are fitted annularly on both surfaces using adhesive means such as a vulcanizing adhesion. Both edges of the rim 3b are extended over the external ends of the wall portions 5b in the radial direction of the wheel with an appropriate space in the axial direction of the wheel. Therefore, if the input load becomes large, the extending portion of the rim 3a touches on the top end of the wall portion 5b to prevent the large deformation.

Figure 5:
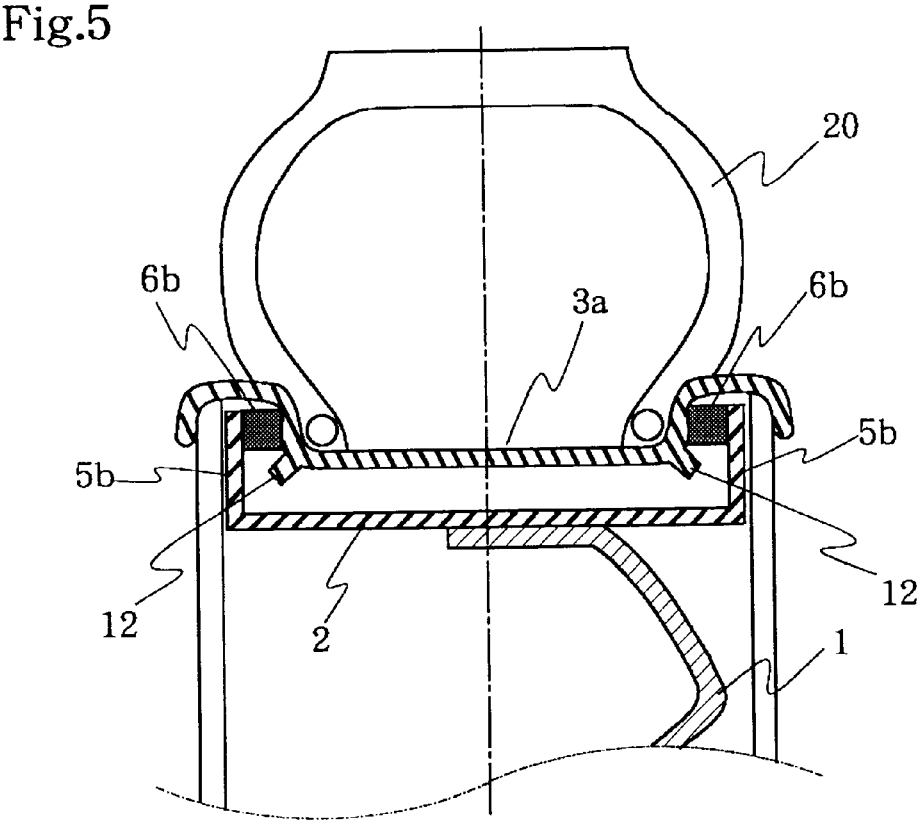
FIG. 5 is a cross sectional view of an enlarged portion of an elastic wheel according to still another embodiment of the present invention.

FIG. 5 is a modified example of the elastic wheel shown in FIG. 4. In this case, the stoppers 12 extend outward from both side surfaces of the base rim 3a to below the rubber elastic bodies 6b, respectively. Therefore, the lower portion of the rubber elastic body 6 touches on the stopper 12 against the large input load to prevent the large deformation.

Figure 6:
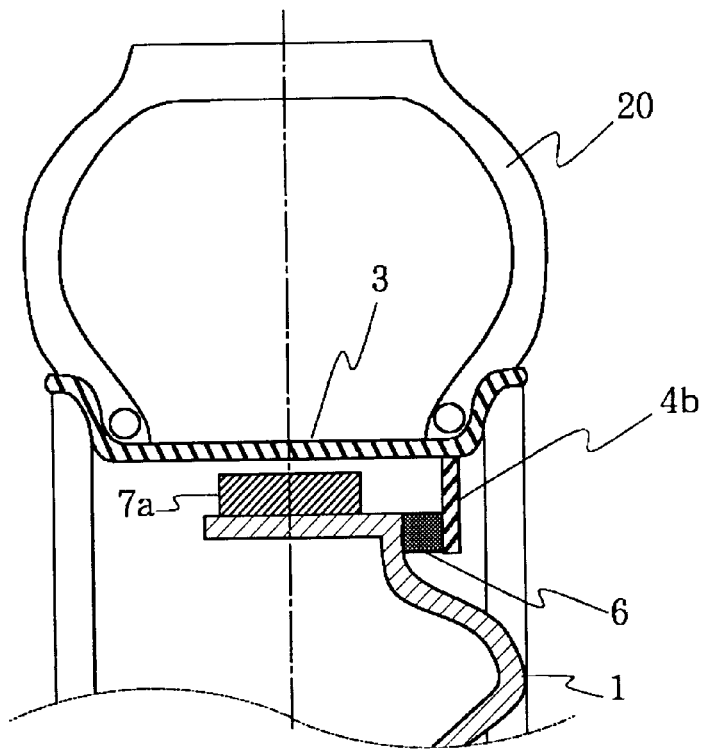
FIG. 6 is a cross sectional view of an enlarged portion of an elastic wheel according to still another embodiment of the present invention.

FIG. 6 shows an elastic wheel according to still another embodiment of the present invention. In the preferred embodiment shown in FIG. 6 which is different from those of the embodiments described above, between the inner side surface of the guide 4b fixed on one end of the internal peripheral surface of the rim 3 and the external side surface of the disk 1, the rubber elastic body 6 is fitted annularly by cementing the rubber elastic body 6 on these surfaces using adhesive means such as a vulcanizing adhesion. In addition, there is another rubber elastic body 7a which is annularly fitted between the inner peripheral surface of the rim 3 and the outer peripheral surface of the disk 1. The rubber elastic body 7a is cemented on the outer peripheral surface of the disk 1, while creating a clearance between the rubber elastic body 7a and the internal peripheral surface of the rim 3. Alternatively, the rubber elastic body 7a may be cemented on the inner peripheral surface of the rim 3, while creating a clearance between the rubber elastic body 7a and the outer peripheral surface of the disk 1. The rubber elastic body 7a serves a function of changing the input load from that of shear force to that of compression. The axial cross sectional profile of the rubber elastic body 7a is a rectangle in the figures. Alternatively, the rubber elastic body in the shape of a semicircle allows that the input load is gradually changed from that of shear force to that of compression.

Figure 8:
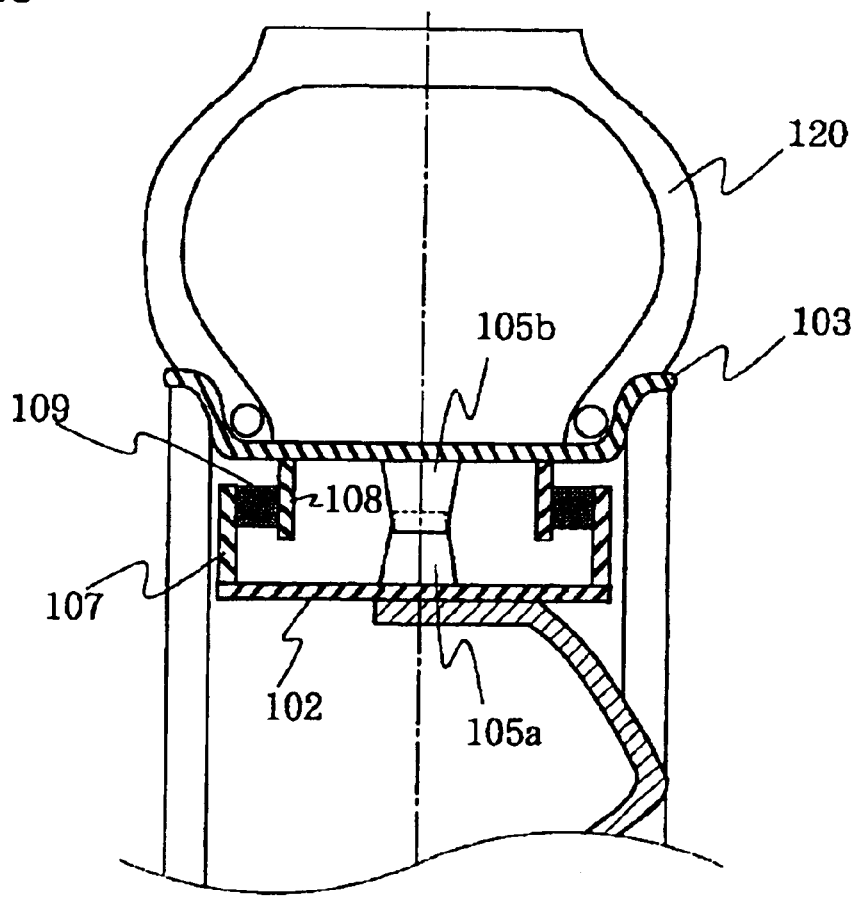
FIG. 8 is a cross sectional view of an enlarged portion of an elastic wheel according to still another embodiment of the present invention.

FIG. 8 shows still another embodiment of the present invention. In this preferred embodiment shown in FIG. 8, a pair of guides 108 is fixed annularly on the inner peripheral surface of a rim 103 that supports a tire 120. Also, a pair of wall portions 107 is fixed annularly on both ends of the outer peripheral surface of a base rim 102 in the axial direction of the wheel. The width between the wall portions 107 is larger than the width between the guides 108. Rubber elastic bodies 109 are fitted annularly between the outer side surfaces of the guides 108 and the inner side surfaces of the wall portions 107, respectively, by cementing the rubber elastic bodies 109 on these surfaces using adhesive means such as a vulcanizing adhesion. The rubber elastic bodies 109 absorb vibrations by shearing deformation to improve the riding comfortableness performance, the vibrationproof performance, and the soundproof performance. Especially, it is more effective on the noise-proof against a high-frequency area of 100 Hz or more. Dent lines 105a, 105b are alternately provided on the outer peripheral surface of the base rim 102 and the inner peripheral surface of the rim 103, respectively, so as to form a mechanism of engaging with each other. Such an engagement mechanism allows the transmission of braking or traction stress from the disk to the rim without loss of the driving safety even though the rubber elastic body is broken out by the over-limited large input load or the like.

Figure 9:
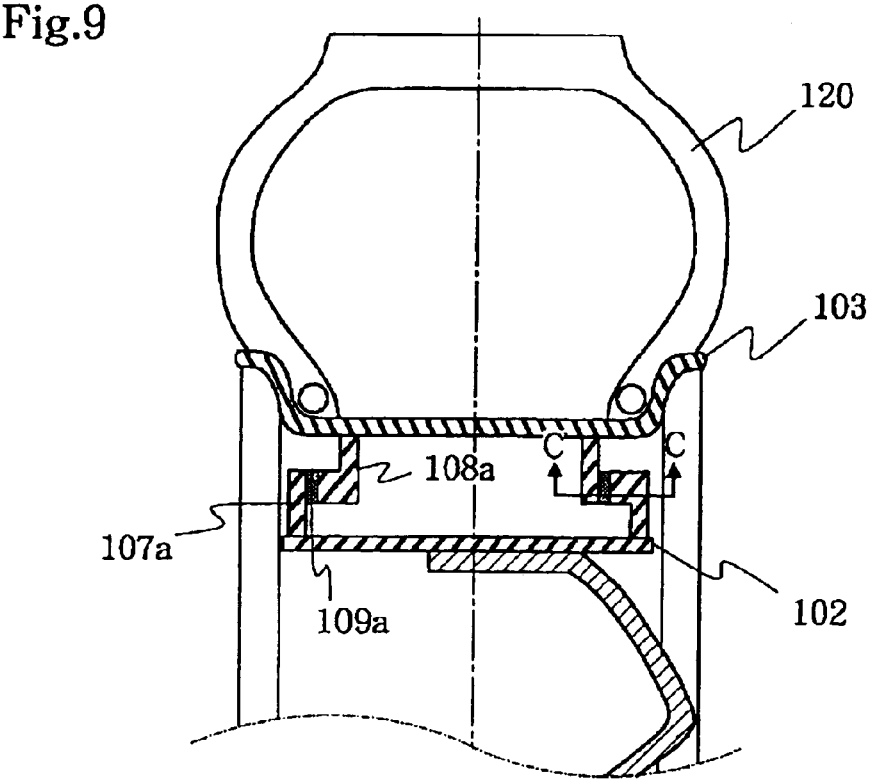
FIG. 9 is a cross sectional view of an enlarged portion of an elastic wheel according to still another embodiment of the present invention.
Figure 10:
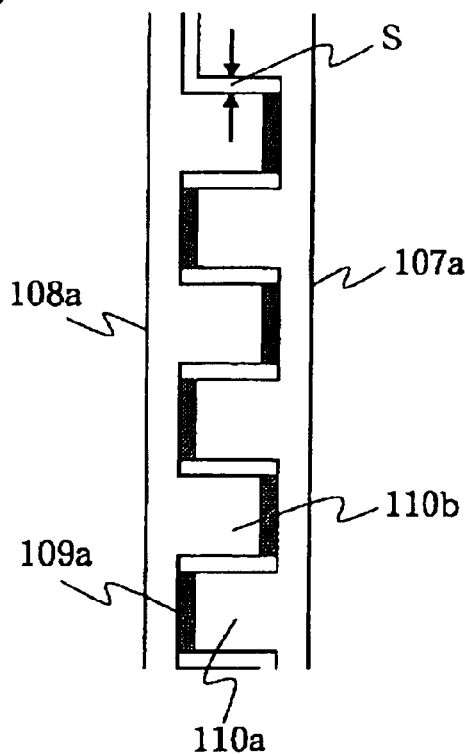
FIG. 10 is a cross sectional view along the line C—C of FIG. 9 in the circumferential direction.

FIG. 9 shows still another embodiment of the present invention. Just as in the case with the preferred embodiment shown in FIG. 8, a pair of guides 108a is fixed annularly on the inner peripheral surface of a rim 103 that supports a tire 120. On the other hand, a pair of wall portions 107a is fixed annularly on both ends of the outer peripheral surface of a base rim 102 in the axial direction of the wheel under the condition where the width between the wall portions 107a is wider than the width between the guides 108a. In this preferred embodiment shown in FIG. 9, an engagement mechanism is provided between the guide 108a and the wall portion 107a. As shown in FIG. 10, which is a cross sectional view along the line C—C in FIG. 9, dent lines 110a, 110b are provided on the inner side surface of the wall portion 107a and the outer side surface of the guide 108a. The dent lines 110a, 110b are engaged with each other even when the over-limited input load breaks the rubber elastic body 109a, allowing the transmission of braking or traction stress from the disk to the rim. There is a space S between the dent lines 110a, 110b, which is enough not to obscure the vibrationproof function of the rubber elastic body like as in the above-mentioned preferred embodiment, and may be adjusted depending on the type of tire or the like if required.

Figure 11:
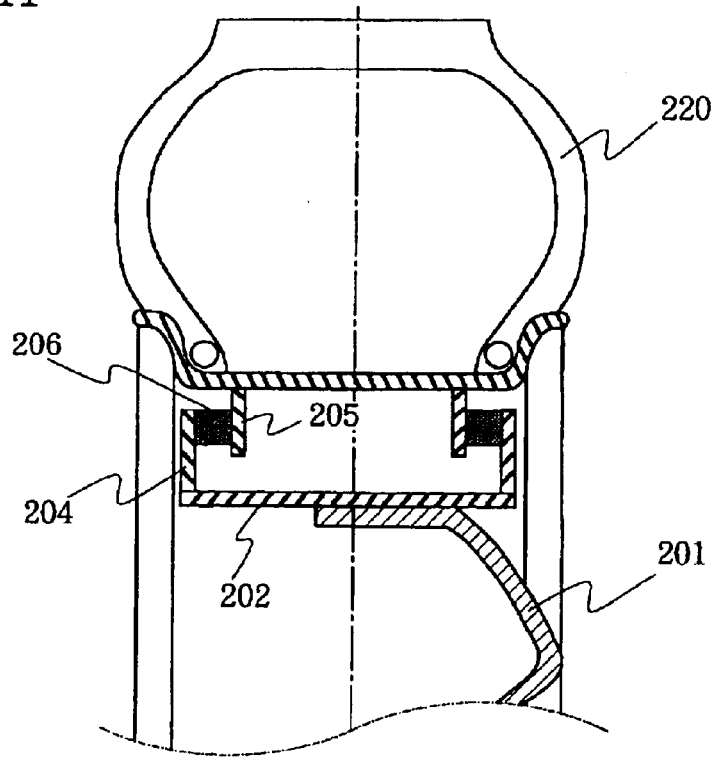
FIG. 11 is a cross sectional view of a portion of an elastic wheel according to still another embodiment of the present invention.

An elastic wheel as still another embodiment of the present invention shown in FIG. 11 comprises a disk 201 fixed on an axle hub (not shown) which has a base rim 202.

Figure 12:
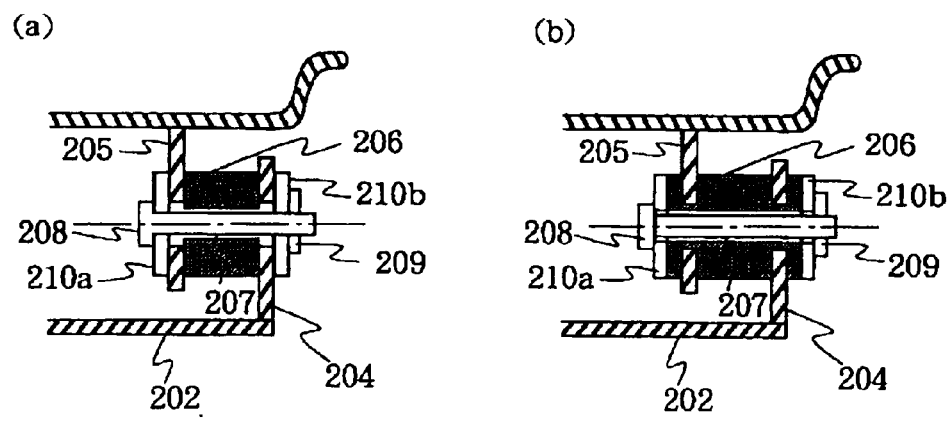
FIG. 12 is a cross sectional view of an enlarged portion on which the rubber elastic body of the elastic wheel shown in FIG. 11 is placed.

The base rim 202 may be integrally molded with the disk 201. A pair of wall portions 204 is fixed annularly on both ends of the outer peripheral surface of the base rim 202 in the axial direction of the wheel under the condition where the width between the wall portions is wider than the width between the guides 205 in the axial direction of the wheel. Rubber elastic bodies 206 are fitted annularly between both outer side surfaces of the guides 205 and both inner side surfaces of the wall portions 204 by adhesive means such as a vulcanizing adhesion, respectively. Therefore, the shearing deformation of the rubber elastic body 206 absorbs the vibrations to improve the riding comfortableness performance, the vibrationproof performance, and the soundproof performance. Especially, it is more effective on the noise-proof against a high-frequency area of 100 Hz or higher. In this preferred embodiment of the present invention, as shown in FIG. 12(a) and FIG. 12(b), a bolt 207 is passed through the rubber elastic body 206 and also loosely passed through the guide 205 and the wall portion 204 in the axial direction of the wheel and two or more bolts are provided on both sides of the axial symmetry with respect to the axis of the tire. Preferably, four or more bolts may be provided. In the example shown in FIG. 12(a), washers 210a, 210b are placed between a head 208 of the bolt 207 and the guide 205 and between the nut 209 and the wall portion 204, respectively. Furthermore, rubber elastic bodies (not shown) in a ring shape may be arranged between the washer 210a and the guide 5 and between the washer 210b and the wall portion 4, respectively. Therefore, such a configuration of the wheel allows the more improvement of vibrationproof effects. In the example shown in FIG. 12(b), on the other hand, the rubber elastic body extends over the openings of wall portion 204 and guide 205 and reaches to the outer peripheries of the openings, respectively. Therefore, it allows the same effects as those of the ring-shaped rubber elastic body described above.

The bolt 207 can be loosely passed through the guide 205 and the wall portion 204 by forming a through hole of each of the guide 205 and the wall portion 204 so that its opening diameter is sufficiently larger than the diameter of the bolt 207. Therefore, it creates a clearance between the outer peripheral surface of the bolt 207 and the inner peripheral surface of each hole enough to keep the vibrationproof functions of the rubber elastic body 206. Concretely, the degree of such clearance may be adjusted depending on the type of a tire or the like if required. Providing the bolt 207 as described above prevents impairment of the function of the rubber elastic body or prevents the falling-out of the rim when the rubber elastic body is broken or the like.

Figure 13:
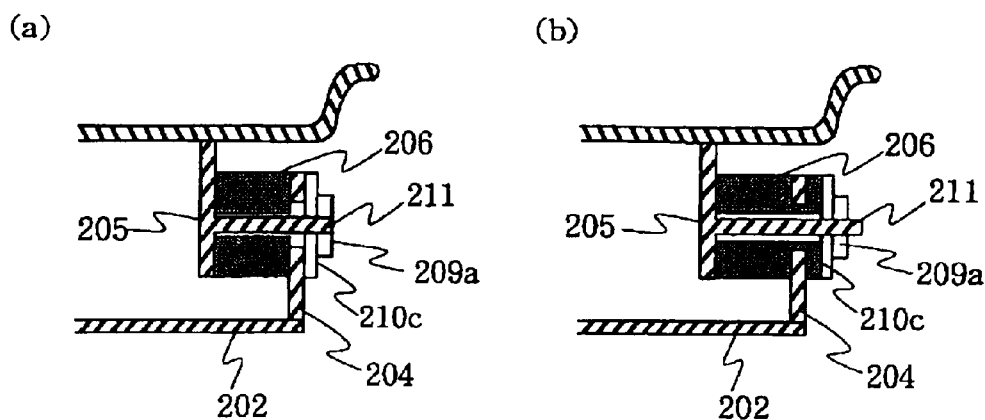
FIG. 13 is a cross sectional view of an enlarged portion on which the rubber elastic body of the elastic wheel according to still another embodiment of the present invention is placed.

As an alternative preferred embodiment, instead of using the bolt 207, as shown in FIGS. 13(a) and 13(b), a projection 211 may be extended from the side surface of the guide 205 and then loosely passed through the wall portion 204 after passing through the rubber elastic body 206 in the axial direction of the wheel. In the example shown in the figure, a nut 209a is screwed securely on the top of the projection 211, where a washer 210c is located between the nut 209a and the wall portion 204. In the example shown in FIG. 13(b), furthermore, the rubber elastic body extends over the hole of the wall portion 204 and reaches to the outside of the hole. Furthermore, although not shown in the figure, a projection may be extended from the side surface of the wall portion 204 and then loosely passed through the guide portion 204 after passing through the rubber elastic body 206 in the axial direction of the wheel. In these cases, the same effects as those of using the above bolt can be obtained.

Figure 14:
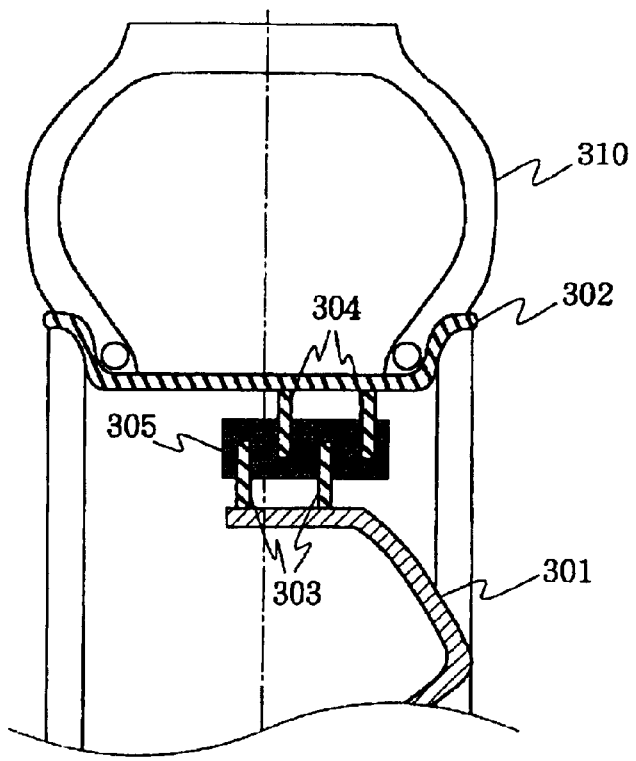
FIG. 14 is a cross sectional view of an enlarged portion of an elastic wheel according to still another embodiment of the present invention.

FIG. 14 shows an elastic wheel as still another embodiment of the present invention that comprises a disk 301 fixed on an axle hub (not shown) and a rim 302 for supporting a tire 310. A pair of guides 304 is fixed annularly on the inner peripheral surface of the rim 302 for supporting the tire 310, while a pair of spacers 303 is fixed annularly on the outer peripheral surface of the disk 301 in an alternating arrangement with the guides 304 in the axial direction of the wheel. Here, base rim (not shown) may be formed on the outer peripheral surface of the disk 301 and the spacers 303 to be provided on the outer peripheral surface of the disk 301 may be fixed on the outer peripheral surface of the base rim.

As shown in the figure, furthermore, a rubber elastic body 305 is fitted annularly between the guides 304 and the spacers 303 so that it covers their tips. The rubber elastic body 305 is cemented to the guides 304 and the spacers 303 by adhesive means such as a vulcanizing adhesion. The outer peripheral surface of the disk 301 and the inner peripheral surface of the rim 302 are not cemented, creating a clearance between them. Creating such clearance allows by the shearing deformation of the rubber elastic body 305 to absorb the vibrations, and particularly the improvements of riding comfortableness performance, vibrationproof performance, and soundproof performance can be attained against the small input load. In addition, the spacers 303 and the guides 304 are alternately arranged in the axial direction of the wheel, so that it provides greater rigidity thereof in the axial direction of the wheel. Thus, the excellent effect of preventing the vibrations in such a direction can be also attained. Furthermore, all the tips of the guides 304 and the spacers 303 are covered with the rubber elastic body 305, so that the large deformation due to the compression force applied on these tips can be prevented.

Figure 15:
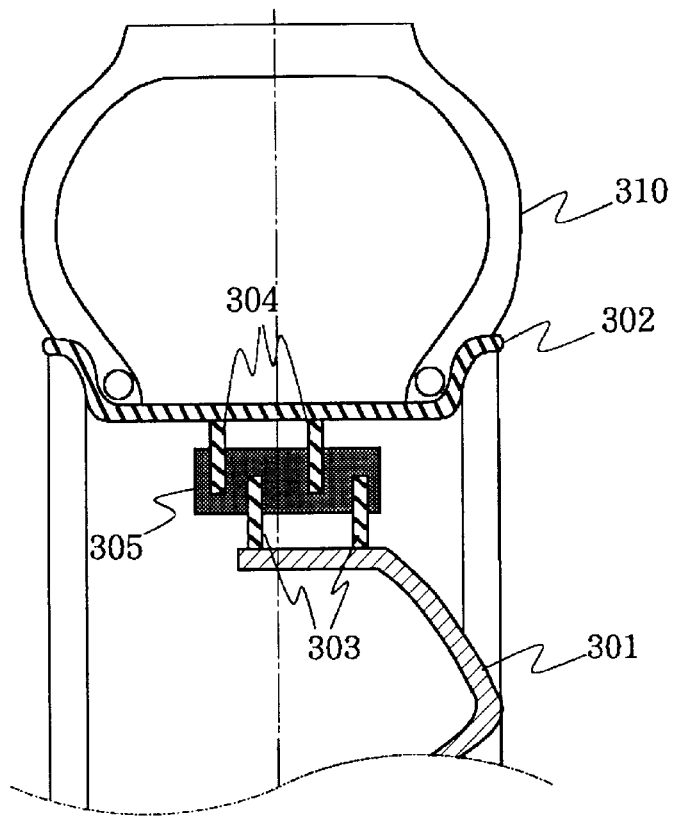
FIG. 15 is a cross sectional view of an enlarged portion of an elastic wheel according to still another embodiment of the present invention.

FIG. 15 shows an elastic wheel as still another embodiment of the present invention, which is constructed just as in the case of FIG. 14 except that the alternate order of arranging the guides 304 and the spacers 303 is different from that of showing in FIG. 14 in the axial direction of the wheel. In this case, the same effects as those of the preferred embodiment shown in FIG. 14 can be also obtained.

Figure 16:
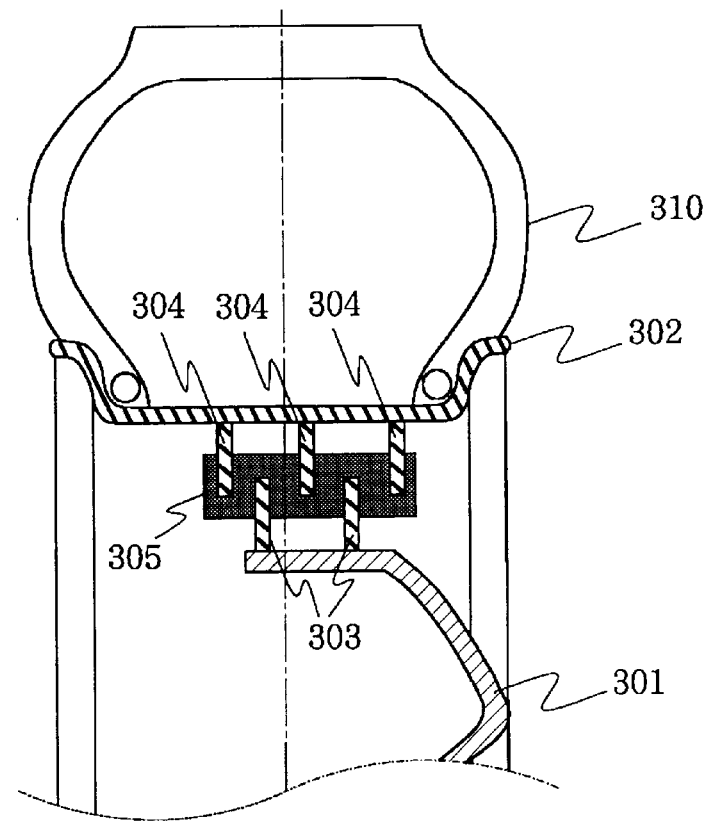
FIG. 16 is a cross sectional view of an enlarged portion of an elastic wheel according to still another embodiment of the present invention.

FIG. 16 shows an elastic wheel as still another embodiment of the present invention. In this preferred embodiment, there are three guides 304 on the inner peripheral surface of the rim 302. These guides 304 and a pair of the spacers 303 on the outer peripheral surface of the disk 301 are alternately arranged in the axial direction of the wheel. The arrangement of another rubber elastic body 305 is the same as that of the preferred embodiment shown in FIG. 14. As the number of the spacers 303 increases by one, the number of the rubber elastic body 305 between the spacer 303 and the guide 304 increases by one, increasing the strength against the large input load. In addition, such a configuration increases the rigidity of the structure in the axial direction of the wheel, resulting in the excellent effects of preventing the vibrations in that direction.

Figure 17:
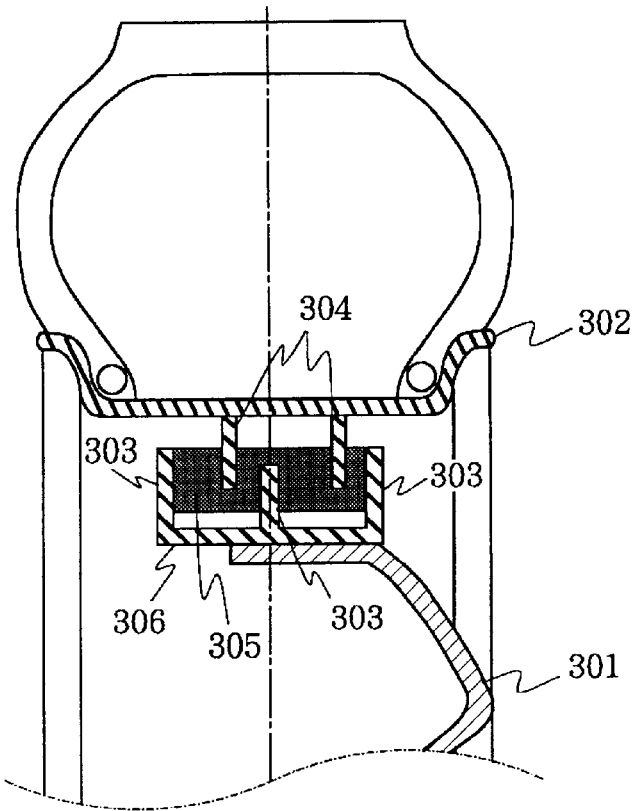
FIG. 17 is a cross sectional view of an enlarged portion of an elastic wheel according to still another embodiment of the present invention.

FIG. 17 shows an elastic wheel as still another embodiment of the present invention. In this preferred embodiment, two guides 304 are fixed on the inner peripheral surface of a rim 302. A base rim 306 is fixed on the outer peripheral surface of a disk 301. In addition, three spacers 303 are formed on the base rim 306. These spacers 303 and the guides 304 are alternately arranged in the axial direction of the wheel. As shown in the figure, a rubber elastic body 305 is fitted annularly between the guides 304 and the spacers 303. Therefore, it covers the tips of two guides 304 and the center spacer 303 (only the central one). In this case, just as in the case with the above embodiments, the vibrations can be absorbed by the shearing deformation of the rubber elastic body 305. In addition, such a configuration increases the rigidity of the structure in the axial direction of the wheel, and is effective in preventing the vibrations in that direction in addition to the effects of preventing the large deformation.

Figure 18:
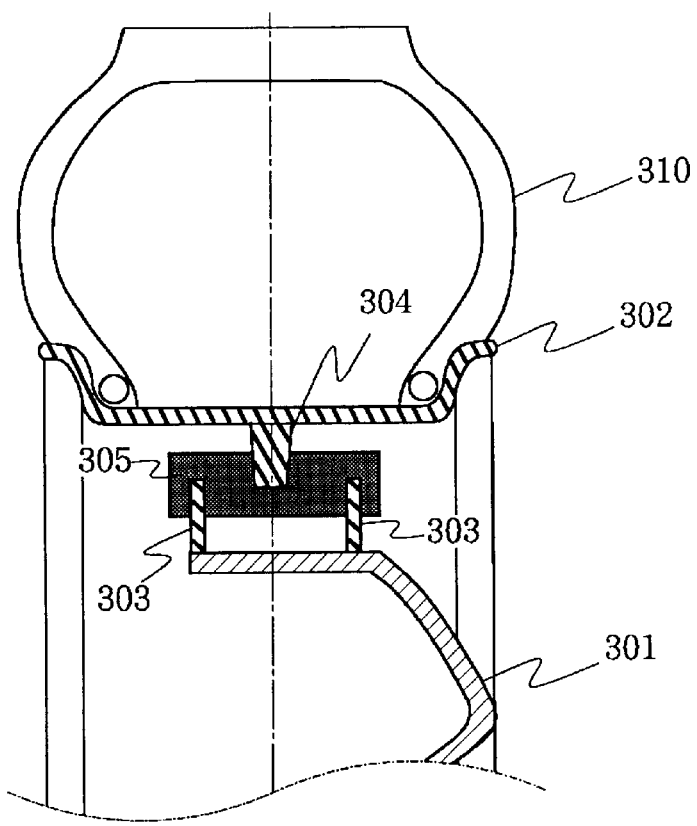
FIG. 18 is a cross sectional view of an enlarged portion of an elastic wheel according to still another embodiment of the present invention.

FIG. 18 shows an elastic wheel as still another embodiment of the present invention that comprises a single guide on the inner surface of a rim 302 and two spacers 303 on the outer peripheral surface of a disk 301. The cross sectional profile of the guide 304 is in a trapezoidal shape in the axial direction of the wheel. In addition, as shown in the figure, a rubber elastic body 305 is fitted annularly between the guide 304 and the spacers 303 so that it covers the tip of them. In the preferred embodiment, different from the above embodiments, the number of the guide 304 is only one, but the guide 304 has a trapezoidal cross sectional shape in the axial direction of the wheel. Thus, the area of contact between the guide 304 and the rubber elastic body 305 becomes extended. The area of the top portion of the guide 304 becomes extended, so that the large deformation can be prevented by covering the top of the guide 304 with the rubber elastic body 305. As a result, the present embodiment also provides the improvements of the riding comfortableness performance, the vibrationproof performance, and the soundproof performance.

Figure 19:
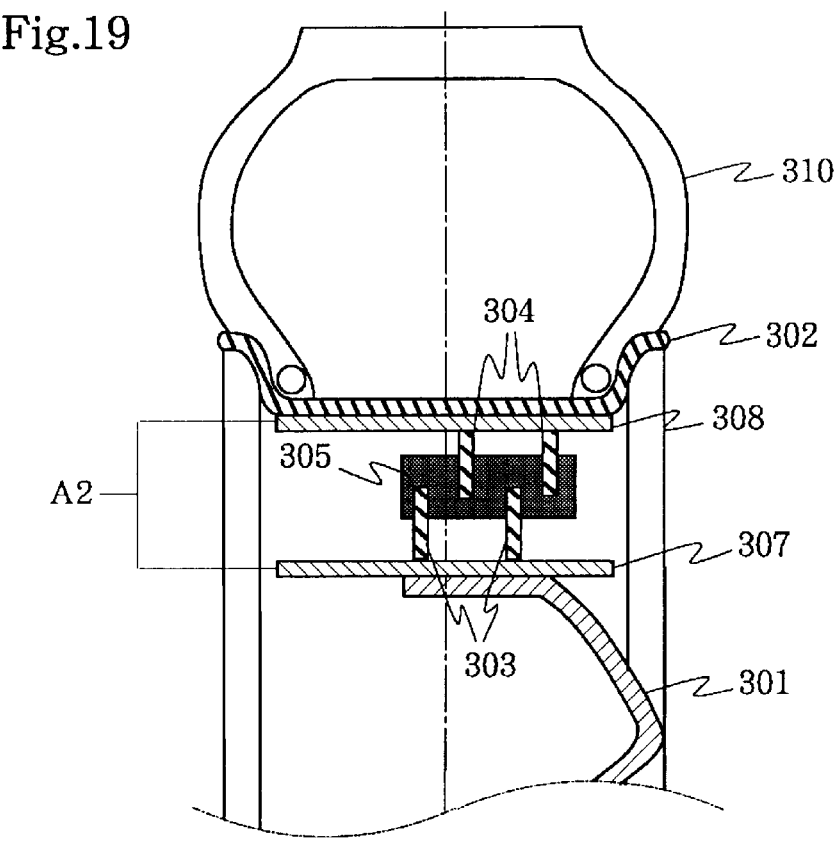
FIG. 19 is a cross sectional view of an enlarged portion of an elastic wheel according to still another embodiment of the present invention.

FIG. 19 shows an elastic wheel as still another embodiment of the present invention, which has an elasticity-providing device A2 having the same functions as those of the preferred embodiment shown in FIG. 14. The device A2 is inserted between the outer peripheral surface of a disk 301 and the inner peripheral surface of a rim 302. The elasticity-providing device A2 comprises: two distinct annular ring bodies having different radiuses and concentrically arranged together; a pair of guides 304 fixed annularly on the inner peripheral surface of the external side annular ring body 308; and a pair of spacers 303 fixed annularly on the outer peripheral surface of the internal side annular ring body 308; and a rubber elastic body 305 fitted annularly between the guides 304 and the spacers 303 like as in the preferred embodiment shown in FIG. 14. The elasticity-providing device A2 provides a structure, which is substantially the same as one provided between the outer peripheral surface of the disk 301 and the inner peripheral surface of the rim 302 shown in FIG. 14, is arranged between the inner peripheral surface of the external annular ring body 308 and the outer peripheral surface of the internal annular ring body 307. Alternatively, it may be of the same structure as that of one of the embodiments shown in FIGS. 15 to 18.

Figure 20:
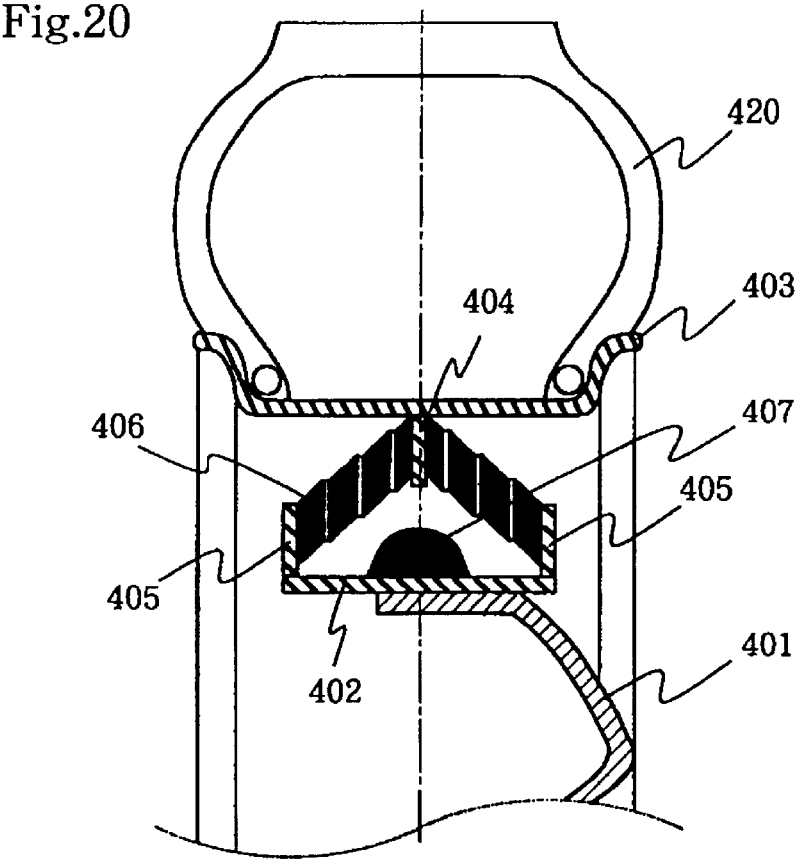
FIG. 20 is a cross sectional view of an enlarged portion of an elastic wheel according to still another embodiment of the present invention.

FIG. 20 shows an elastic wheel as still another embodiment of the present invention that comprises a disk 401 fixed on an axle hub (not shown) and a base rim 402. In addition, there is a guide 404 fixed annularly on almost the middle portion of the inner peripheral surface of the rim 403 for supporting a tire 420 in the axial direction of the wheel. A pair of wall portions 405 is fixed annularly on both ends of the outer peripheral surface of the base rim 402. A rubber-stacked body annularly extends and is cemented between the both side surfaces of the guide 404 and the corresponding inner sides of the wall portions 405 using adhesive means such a as a vulcanizing adhesion, respectively. To provide greater rigidity of the structure, as shown in the figure, it is preferable to shape the cross sectional profile of the rubber-stacked body 406 like a chevron having the top that corresponds to the guide 404 in the axial direction of the wheel. The rubber-stacked body 406 is formed by stacking rubber and steel plates in alternate order in the axial direction of the wheel. Such a stacked structure has been known as a vibrationproof material in the fields of construction materials or the like. The existence of such rubber-stacked body 406 makes it possible to absorb vibrations by the vertical shearing deformation of the rubber-stacked body. Especially, for the small input load, the improvements of riding comfortableness performance, vibrationproof performance, and soundproof performance can be attained, while providing greater rigidity of the structure in the axial direction of the wheel compared with one in the radial direction of the wheel. Therefore, the rigidity in the lateral direction of the tire can be kept, so that the decrease in driving stability can be prevented.

Furthermore, an additional rubber elastic body 407 is placed annularly on the outer peripheral surface of the base rim 402 facing to the free end of the guide 404 in the radial direction of the wheel, with appropriate clearance created between them. The rubber elastic body 407 may be cemented on the outer peripheral surface of the base rim 402 by adhesive means such as a vulcanizing adhesion. If the large input load is generated, the rubber elastic body 407 provided as a stopper prevents the large deformation by its compression action.

Alternatively, by the way, the configuration of the present embodiment may be modified by reversing the structural relationship between the guide 404 and the wall portion 405 so that a pair of guides 404 is positioned on the both side areas in the axial direction of the wheel and the wall portion 405 is positioned on the middle of the rim 403 in the axial direction of the wheel to make the rubber-stacked body 406 extend over and being provided annularly between both side surfaces of the wall portion 405 and the both inner side surfaces of the guides 404, obtaining the same effects as those of the above embodiments.

Figure 21:
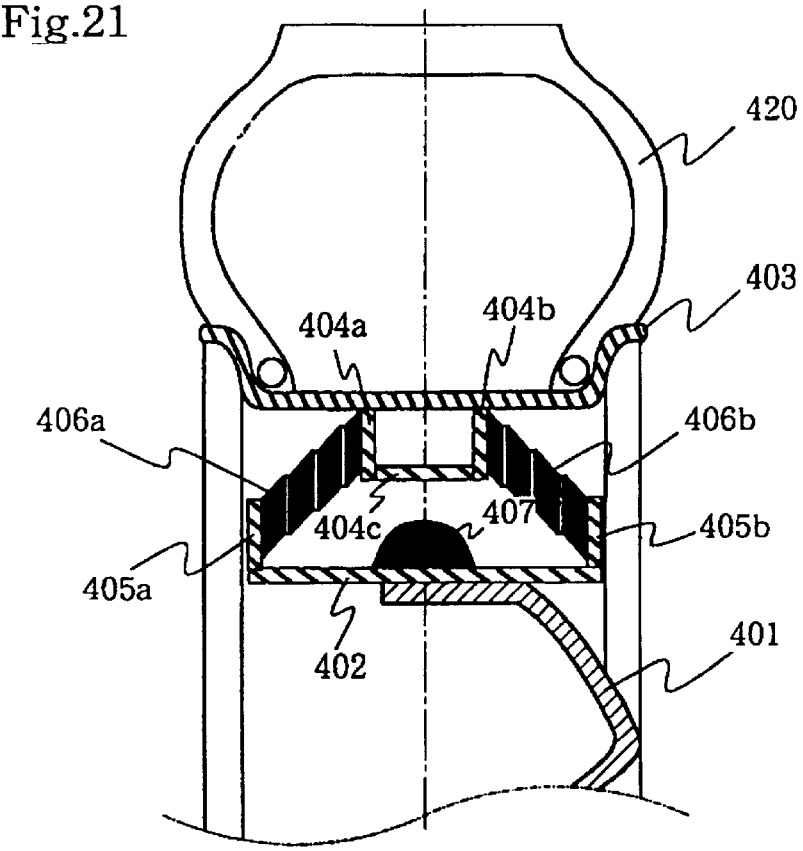
FIG. 21 is a cross sectional view of an enlarged portion of an elastic wheel according to still another embodiment of the present invention.

An elastic wheel as still another embodiment of the present invention, as shown FIG. 21, comprises a pair of guides 404a, 404b arranged annularly in parallel and a pair of wall portions 405a, 405b arranged annularly in parallel with a larger width thereof compared with a width between the pair of guides 404a, 404b in the axial direction of the wheel. In the preferred embodiment shown in the figure, the inner ends of the pair of guides 405a, 405b in the radial direction of the wheel are connected to each other to form a U shape in cross section in the axial direction of the wheel. Rubber-stacked bodies 406a, 406b are provided annularly between the outer side surfaces of the pair of guides 404a, 404b and the inner side surfaces of the pair of wall portions 405a, 405b, respectively. To provide greater rigidity of the structure in the vertical direction, in this case, it is also preferable to shape the cross sectional profile of the rubber-stacked bodies 406a, 406b like a chevron with the top directed to the guides 404a, 404b in the axial direction of the wheel. The existence of such rubber-stacked bodies 406a, 406b makes it possible to provide the same effects as those of the above preferred embodiment to improve the riding comfortableness performance, the vibrationproof performance, and the soundproof performance in addition to prevent the decrease in driving stability.

A rubber elastic body 407 as a stopper is fixed annularly on the outer peripheral surface of the base rim 402 facing to the connect surface 404c formed by the connection between both inner ends of the guides 404a, 404b so as to make a space between the contact surface 404c and the rubber elastic body 407. Thus, the existence of such a rubber elastic body 407 makes it possible to prevent the large deformation by the compression action of the rubber elastic body 407 as a stopper even when the large input load is generated like as the case of the preferred embodiment described above.

Alternatively, the configuration of the present embodiment may be modified in which the structural relationship between the guides 404a, 404b and the wall portions 405a, 405b is reversed, where the pair of wall portions 405a, 405b is arranged in parallel so as to have a width smaller than that of the guides 404a, 404b arranged in parallel and the rubber-stacked bodies 406a, 406b are provided annularly between the inner side surfaces of the pair of guides 404a, 404b and the outer side surfaces of the pair of wall portions 405a, 405b, respectively. Consequently, such a modified configuration of the present embodiment also provides the same effects as those of the above embodiments.

Figure 22:
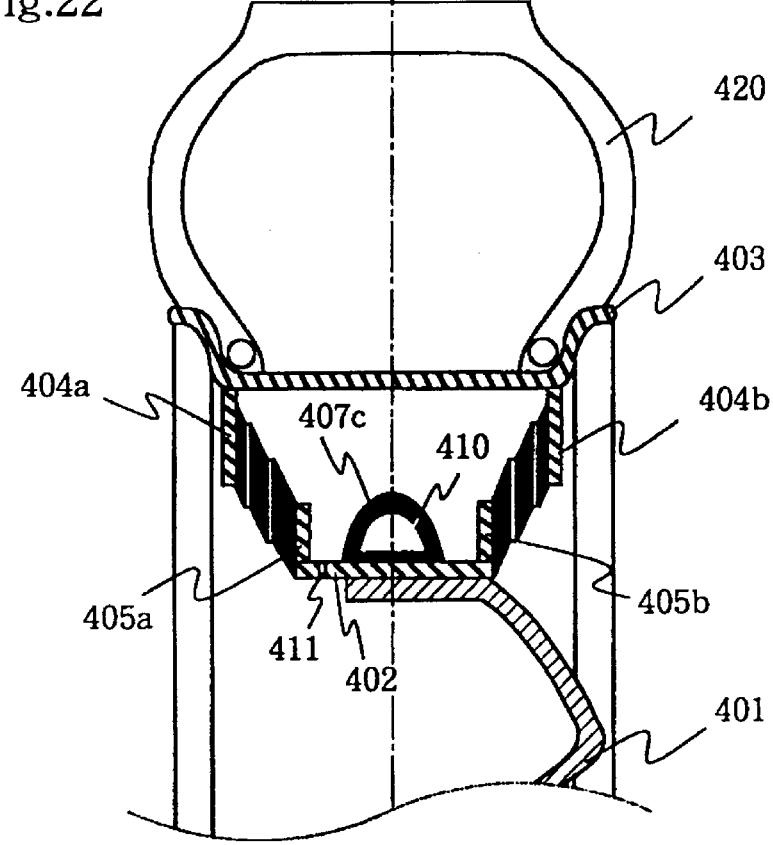
FIG. 22 is a cross sectional view of an enlarged portion of an elastic wheel according to still another embodiment of the present invention.

In this case, as shown in FIG. 22, the rubber elastic body 407c may be arranged annularly on the outer peripheral surface of the base rim 402 so that the height of the rubber elastic body 407c in the radial direction of the wheel may be higher than the wall portions 405a, 405b located on the both sides thereof. It is not limited to any particular installation location or mode of the rubber elastic body 407c as far as the rubber elastic body 407c functions as a stopper at the time of the generation of large input load. In the preferred embodiment shown in FIG. 22, the rubber elastic body 407c is provided as a hollow body having a hole 410. Also, the base rim has a hole 411 as an orifice to be functioned as an air damping. Furthermore, the hole diameter may be made as a variable one to vary the damping force to be applied thereon. As a result, the selected appropriate air damping action allows the further increase of riding comfortableness performance, vibrationproof performance, and soundproof performance.

Figure 23:
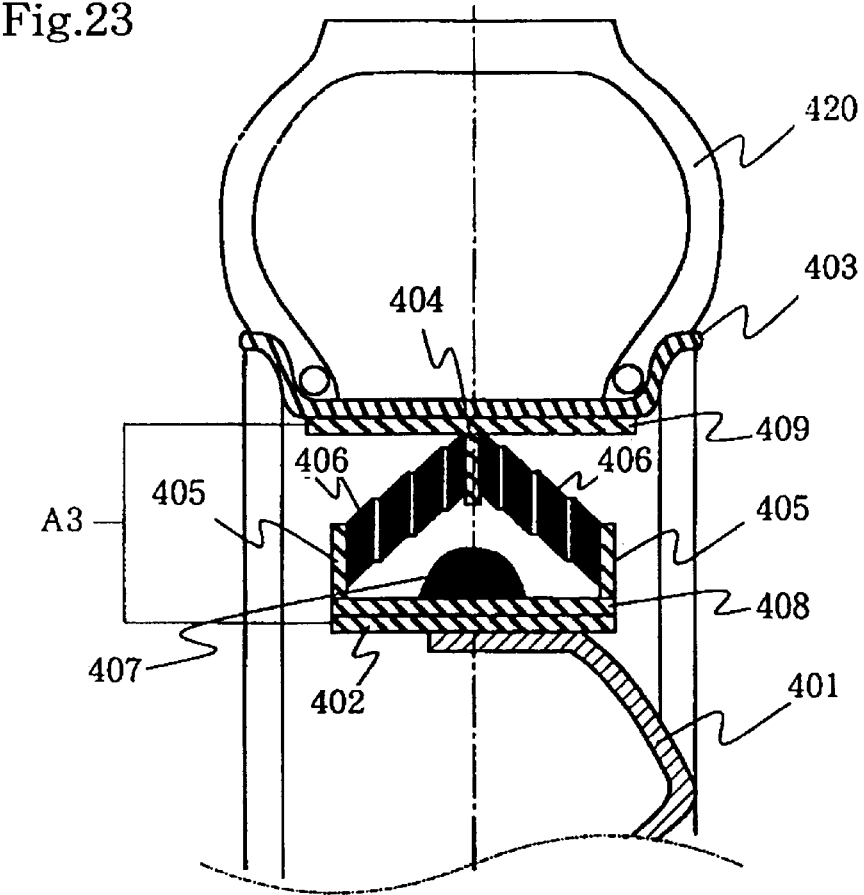
FIG. 23 is a cross sectional view of an enlarged portion of an elastic wheel according to still another embodiment of the present invention.

FIG. 23 shows an elastic wheel as still another embodiment of the present invention. In the preferred embodiment, an elasticity-providing device A3 having the same functions as those of the embodiment shown in FIG. 20 is fitted in a space between the outer peripheral surface of a base rim 402 and the inner peripheral surface of a rim 403. The elasticity-providing device A3 comprises a guide 404 fixed annularly on the middle portion, in the axial direction of the wheel, of the inner peripheral surface of an external annular ring body 409 of two distinct annular ring bodies having different radiuses and concentrically arranged together; and a pair of wall portions 405 fixed annularly on both ends of the outer peripheral surface of an internal annular ring body 408 in the axial direction of the wheel. Furthermore, rubber-stacked bodies 406 are provided annularly between both side surfaces of the guide 404 and both inner sides of the wall portions 405, respectively. A rubber elastic body 407 is placed annularly on the outer peripheral surface of the internal annular ring body 408 facing to the free end of the guide 404 in the radial direction of the wheel with an appropriate clearance therebetween.

The elasticity-providing device A3 is not limited to one shown in FIG. 20, and the structural body of any one of the other embodiments of the present invention may be applied between the inner peripheral surface of the external annular ring body 409 and the outer peripheral surface of the internal annular ring body 408. In addition, the rubber-stacked bodies shown in FIGS. 20 to 23 are inclined in the axial direction of the wheel. Alternatively, it may be arranged in parallel.

Next, the results of evaluation test on the performance of the elastic wheel according to one of the preferred embodiments of the present invention will be described below.

Under the following conditions, an elastic wheel with the rubber elastic body having the shape shown in FIG. 1 and being annularly fitted thereon was fabricated by way of trial and was then equipped with a tire in the size of 185/55R15. Subsequently, the elastic wheel with the tire was evaluated with respect to the vibration-absorbing characteristics and the soundproof performance. The evaluation tests were performed as follows.

(Rim)
  Size: 15 inches
  Width: 5.5 J
(Rubber Elastic Body)
  Dimensions: 11 mm long and 15 mm width
  JIS-A hardness: 60°
  Coefficient of elasticity: $4 \times 10^4$ N/cm$^2$
  Distance between the rim and the base rim in the radial direction of the wheel: 25 mm
  Distance between the stopper 7 and the inner peripheral surface 4a: 6 mm
(Vibration-absorbing Characteristics)
  An axle force of moving vehicle was measured using an acceleration sensor.
(Noise-proof Characteristics)
  An acoustic pressure of the moving vehicle was measured using a microphone equipped on the front of a driver's seat.

The results of the above evaluation of vibration-absorbing characteristics reveal that the elastic wheel of any one of the above embodiments absorbed vibrations by the shearing deformation of the rubber elastic body 6 at the time of the small input load. Also, the large deformation was inhibited by the compression input load of the rubber elastic body 7 at the time of the large input load. Consequently, the improvements of riding comfortableness performance, vibrationproof performance, and soundproof performance can be attained with respect to different degrees from small input load to large input load without impairing durability and safety. In addition, the results of estimating noise-proof characteristics, it was found that it was more effective on the noise-proof against a high-frequency area of 100 Hz or higher. The same effects were obtained with respect to other embodiments described above.

Figure 24:
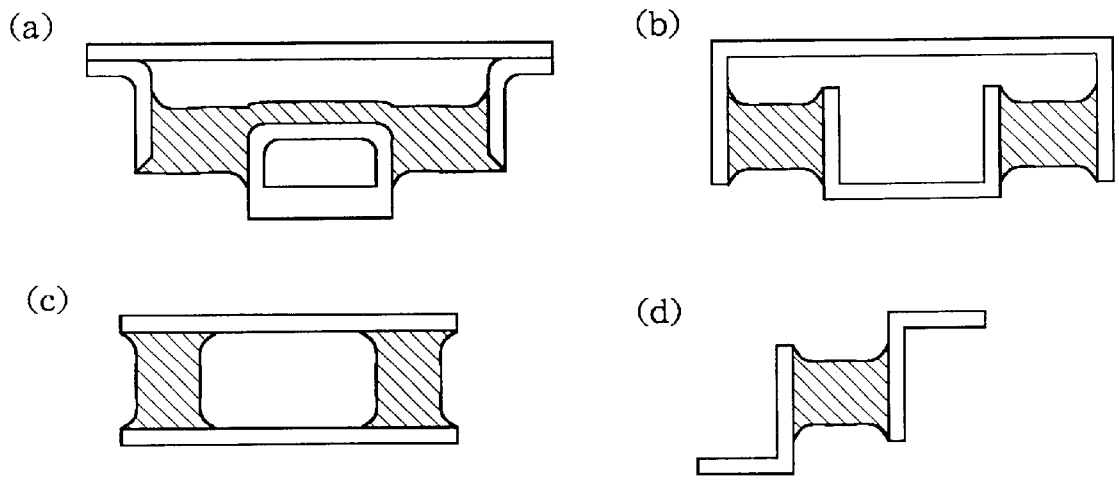
FIG. 24 is a cross sectional view illustrating various types of the rubber elastic bodies.

Next, some models were fabricated, i.e., models of the shearing type rubber elastic body, with both ends being held, having a stopper (FIG. 24(a)), without a stopper (FIG. 24(b)), the compression type rubber elastic body (FIG. 24(c)), and the shearing type rubber elastic body with one of the ends being held (FIG. 24(d)). Each of the types shown in FIG. 24 used a rubber elastic body made of the same material.

Figure 25:
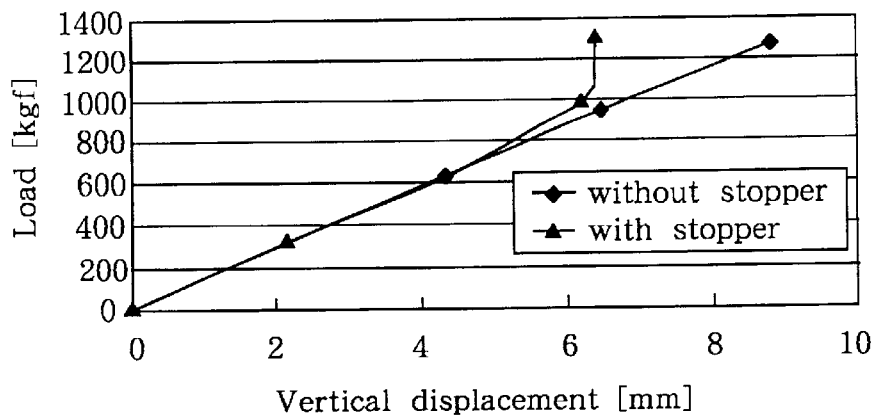
FIG. 25 is a graph that represents the relationship between the amount of vertical displacement and the graph.

In FIG. 24(a) and (b), the evaluation was performed with respect to the effects of preventing large deformation in the presence or absence of the stopper. Concretely, a load is imposed from above and then the relationship between the amount of vertical displacement and the load. The obtained results are shown in FIG. 25. As is evident from FIG. 25, when the amount of displacement exceeds 6 mm in the case of the one with the stopper (a), the stopper functions to prevent the exceeding displacement. Thereby, the destruction of the shearing type rubber elastic body by the large input load can be prevented.

Figure 26:
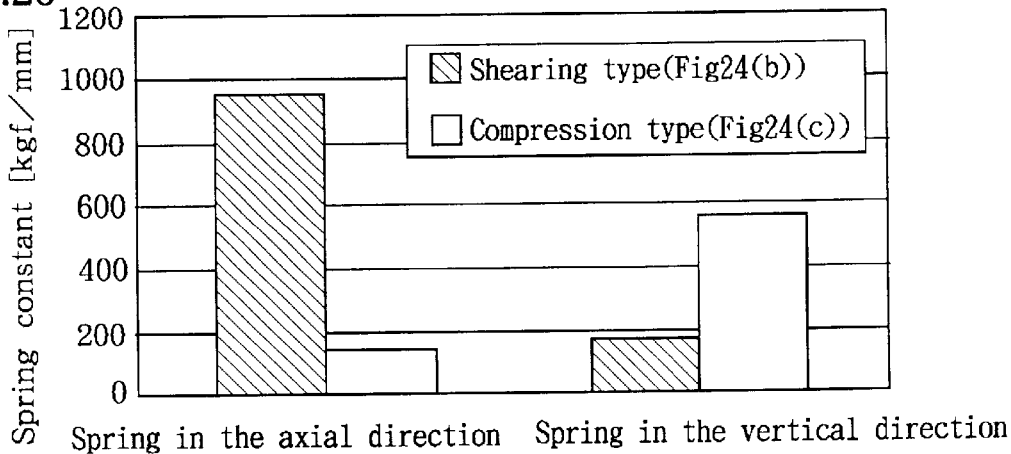
FIG. 26 is a graph that represents the relationship between the type of rubber elastic body and the spring constant.

In FIG. 24(b) and (c), the spring constant in the axial direction was compared with the spring constant in the vertical direction. Specifically, they are inputted from above and from the axial direction to obtain the respective spring constants. The obtained results are shown in FIG. 26. As is evident from the graph of FIG. 26, the rigidity of (b) in the axial direction is higher than that of (c), so that it is understood that it excels in operation stability. Moreover, about the vertical direction, (b) is small than (c), so that it is understood that it excels in the vibration absorption characteristics.

Figure 27:
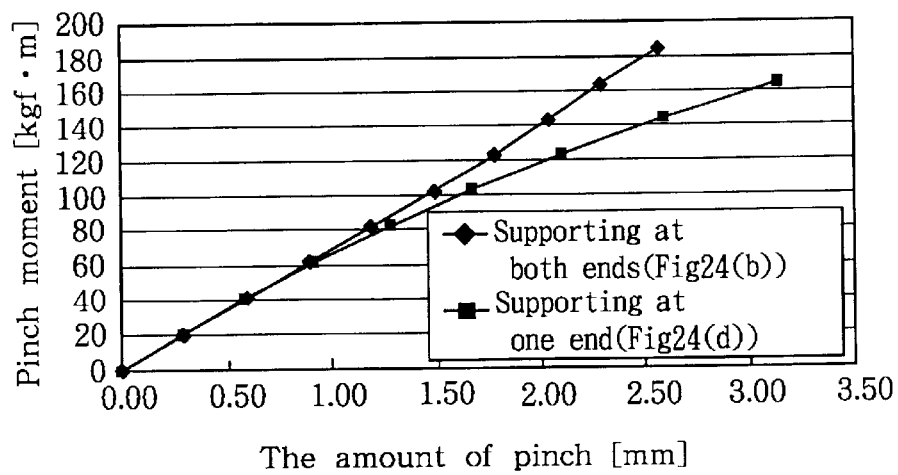
FIG. 27 is a graph that represents the relationship between the amount of pinch and the pinch moment.

In FIG. 24(b) and (d), the comparison of uniformities was performed. Specifically, the relationship between the amount of pinch and the moment of pinch. The obtained results are shown in FIG. 27. As is evident from the graph of FIG. 27, the deformation against the pinch of (b) is smaller than the deformation against the pinch of (d), so that it turns out that it excels the durability and the handling stability.

INDUSTRIAL APPLICABILITY

As described above, the elastic wheel of the present invention is able to improve the riding comfortableness performance, the vibrationproof performance, and the soundproof performance without impairing durability and safety at the time of small input load to the time of large input load.

What is claimed is:

1. An elastic wheel having a disk equipped with a base rim and a rim for supporting a tire, comprising:
    a pair of guides fixed annularly on the inner peripheral surface of the rim; and
    a pair of wall portions having outer ends and being fixed annularly on the outer peripheral surface of the base rim,
    wherein a width of the pair of guides in the axial direction of the wheel is greater than a width of the pair of wall portions in the axial direction of the wheel, the outer ends of the pair of wall portions in the radial direction of the wheel are connected to each other to form a generally inverted U-shape in cross section in the axial direction of the wheel, and a rubber elastic body is fitted annularly between an outer peripheral surface of the wall portions in a generally inverted U-shape and an inner peripheral surface of the rim with a space provided between one of the surfaces and the elastic body.

2. An elastic wheel having a disk equipped with a base rim and a rim for supporting a tire, an elasticity-providing device, between an outer peripheral surface of said base rim and an inner peripheral surface of said rim, the elasticity-providing device comprising;
    a pair of guides annularly on an internal peripheral surface of an external annular ring body of two annular ring bodies having different radiuses and concentrically arranged together; and
    a pair of wall portions annularly on an outer peripheral surface of an internal annular ring body,
    wherein a width of the pair of guides in the axial direction of the wheel is greater than a width of the pair of wall portions in the axial direction of the wheel, the pair of wall portions having outer ends in the radial direction of the wheel, the outer ends being connected to each other to form a generally inverted U-shape in cross section in the axial direction of the wheel, and rubber elastic bodies annularly between outer peripheral surfaces of the wall portions having the inverted U-shape and an inner peripheral surface of said external annular ring body, respectively, with a space between one of the surfaces and the elastic body.

* * * * *

UNITED STATES PATENT AND TRADEMARK OFFICE
CERTIFICATE OF CORRECTION

PATENT NO. : 6,732,775 B1
DATED : May 11, 2004
INVENTOR(S) : Hirohumi Kikuchi et al.

It is certified that error appears in the above-identified patent and that said Letters Patent is hereby corrected as shown below:

Title page,
Item [73], Assignee, please delete "Bridgestone Corporation, Tokyo (JP)" and insert
-- Bridgestone Corporation, Tokyo (JP) and Topy Industries, Limited, Tokyo (JP) --

Signed and Sealed this

Ninth Day of November, 2004

JON W. DUDAS
*Director of the United States Patent and Trademark Office*